(12) United States Patent
Ouderkirk et al.

(10) Patent No.: US 11,782,279 B2
(45) Date of Patent: Oct. 10, 2023

(54) HIGH EFFICIENCY PANCAKE LENS

(71) Applicant: META PLATFORMS TECHNOLOGIES, LLC, Menlo Park, CA (US)

(72) Inventors: Andrew John Ouderkirk, Kirkland, WA (US); Liliana Ruiz Diaz, Bothell, WA (US); Robin Sharma, Woodinville, WA (US); Hannah Noble, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 6 days.

(21) Appl. No.: 17/704,850

(22) Filed: Mar. 25, 2022

(65) Prior Publication Data

US 2022/0350148 A1    Nov. 3, 2022

Related U.S. Application Data

(60) Provisional application No. 63/181,359, filed on Apr. 29, 2021.

(51) Int. Cl.
*G02B 27/01*    (2006.01)
*G06T 19/00*    (2011.01)
(Continued)

(52) U.S. Cl.
CPC ..... *G02B 27/0172* (2013.01); *G02B 27/1006* (2013.01); *G02B 27/144* (2013.01);
(Continued)

(58) Field of Classification Search
CPC .......... G02B 27/144; G02B 2027/0178; G02B 27/0172; G02B 27/283
See application file for complete search history.

(56) References Cited

U.S. PATENT DOCUMENTS 10,474,229 B1    11/2019    Gollier et al.
2002/0024743 A1    2/2002    Endo et al.
(Continued)

FOREIGN PATENT DOCUMENTS

WO    WO-2022059089 A1 *    3/2022

OTHER PUBLICATIONS

Anonymous: "Reflectance—Wikipedia," XP0557'33904, Jun. 13, 2020, retrieved on [Sep. 25, 2020], 10 pages, Retrieved from the Internet:URL: https://en.wikipedia.orq/w/index.php?title=Reflectance &oldid=962344210.

(Continued)

*Primary Examiner* — Alexander P Gross
(74) *Attorney, Agent, or Firm* — Greenberg Traurig, LLP

(57) ABSTRACT

An example apparatus may include a display, a beamsplitter having a first region and a second region, and a reflective polarizer. The reflectance of the second region of the beamsplitter may be appreciably greater than the reflectance of the first region; for example, at least approximately 20% greater. In some examples, the second region may be a peripheral region surrounding a generally centrally located first region. An example apparatus may be configured so that at least some light emitted by the display is transmitted through the first region of the beamsplitter, reflects from the reflective polarizer, reflects from the second region of the beamsplitter, and is then directed through the reflective polarizer to an eye of a user when the user wears the apparatus. Other devices, methods, systems, and computer-readable media are also disclosed.

20 Claims, 19 Drawing Sheets

(51) Int. Cl.
*G02F 1/13363* (2006.01)
*G02F 1/1335* (2006.01)
*G02B 27/10* (2006.01)
*G02B 27/28* (2006.01)
*G02B 27/14* (2006.01)

(52) U.S. Cl.
CPC ..... *G02B 27/283* (2013.01); *G02F 1/133541* (2021.01); *G02F 1/133638* (2021.01); *G06T 19/006* (2013.01); *G02B 2027/0178* (2013.01)

(56) References Cited

U.S. PATENT DOCUMENTS

2019/0033581 A1  1/2019  Li et al.
2019/0285902 A1* 9/2019  Ouderkirk .............. G02B 27/30

OTHER PUBLICATIONS

International Search Report and Written Opinion for International Application No. PCT/US2022/026691 dated Aug. 12, 2022, 10 pages.

\* cited by examiner

HIGH EFFICIENCY PANCAKE LENS

CROSS REFERENCE TO RELATED APPLICATION

This application claims the benefit of U.S. Provisional Application No. 63/181,359, filed Apr. 29, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
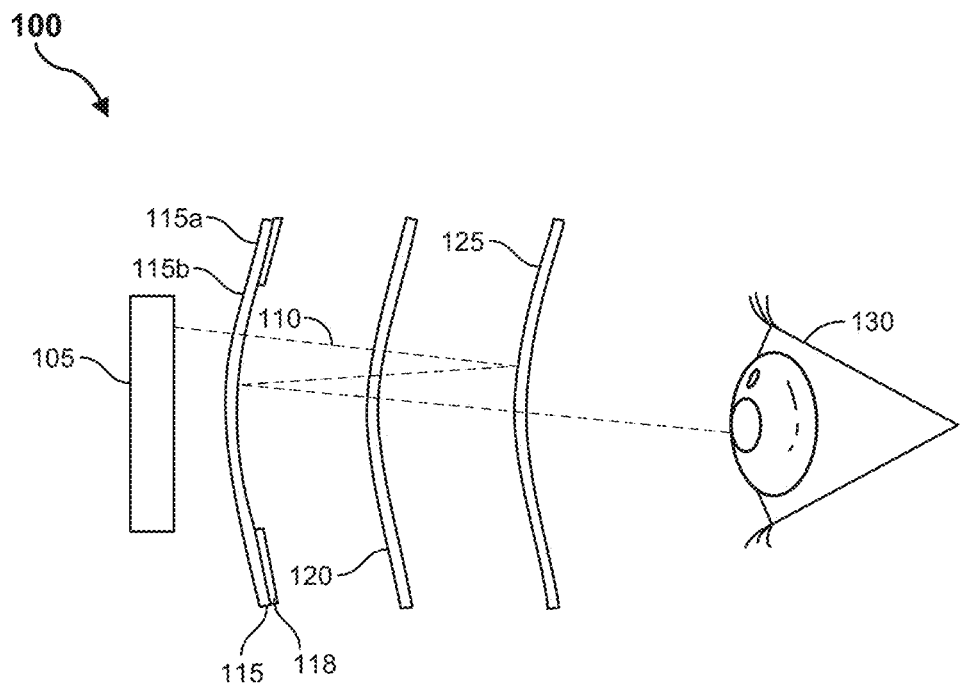
FIG. 1 is an illustration of an example compact display and imaging system that includes a display that emits a ray having a first circular polarization.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and is described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to optical configurations, devices including optical configurations, and associated methods. As is explained in greater detail below, embodiments of the present disclosure may include a folded optic configuration suitable for virtual and/or augmented reality systems, where an example device may provide a higher total optical throughput and/or improved image uniformity. Examples applications of the same include augmented reality and/or virtual reality (AR/VR) devices.

An example apparatus may have a folded optic configuration including a lens and a beamsplitter. In this context, a folded optic configuration may provide a light path that includes one or more reflections. An apparatus having a folded optic configuration may be compact, have a wide field-of-view (FOV), and allow formation of high-resolution images. Higher lens system efficiency may be useful for applications such as head-mounted displays (HMDs), including virtual reality and/or augmented reality applications. Higher lens efficiency may increase the usability of the system and/or decrease power consumption of a display backlight to provide a desired display brightness. This may reduce device heating and increase battery life for a desired image brightness.

An example device may include a display, a pancake lens (e.g., having a beamsplitter that may be formed as a coating on a lens surface), and a reflective polarizer (e.g., configured to reflect a first polarization of light and transmit a second polarization of light, where the first polarization and second polarization are different). For example, a reflective polarizer may be configured to reflect one handedness of circular polarized light and transmit the other handedness of circularly polarized light In some examples, an apparatus may include a pancake lens including a beamsplitter formed as a coating on a lens, and a reflective polarizer that reflects one handedness of circular polarized light and transmits the other handedness of circularly polarized light. Example reflective polarizers include, without limitation, cholesteric reflective polarizers (CLCs) and/or multilayer birefringent reflective polarizers.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
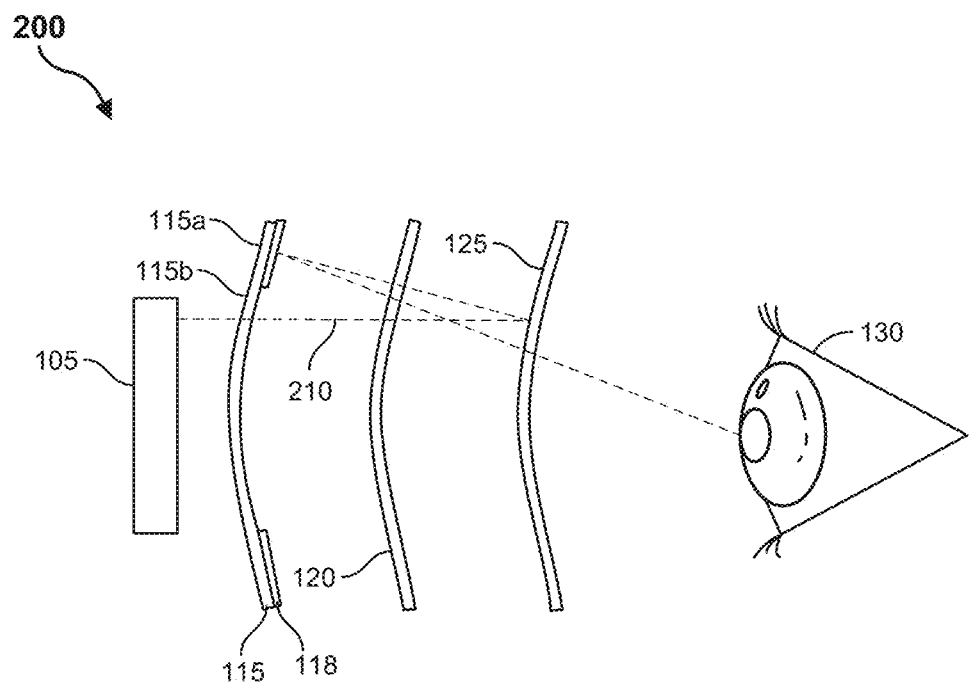
FIG. 2 is an illustration of an example ray path in which the light reflects off a high reflectance region of a beamsplitter.
Figure 3:
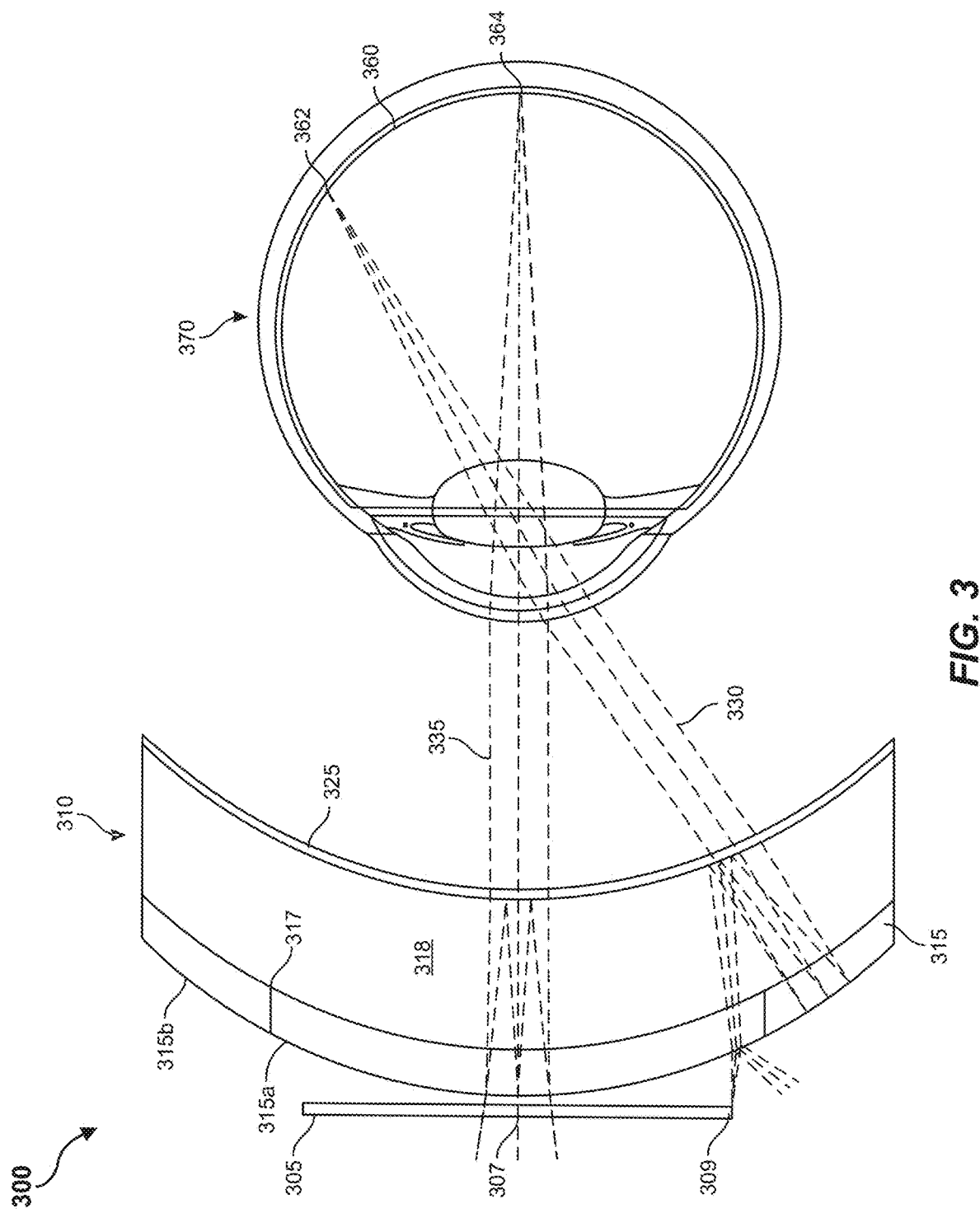
FIG. 3 is an illustration of an example folded optic configuration, including a display panel and a beamsplitter lens that includes both a first region that is partially reflective and partially transparent, and a second region that is relatively highly reflective compared to the first region.
Figure 4:
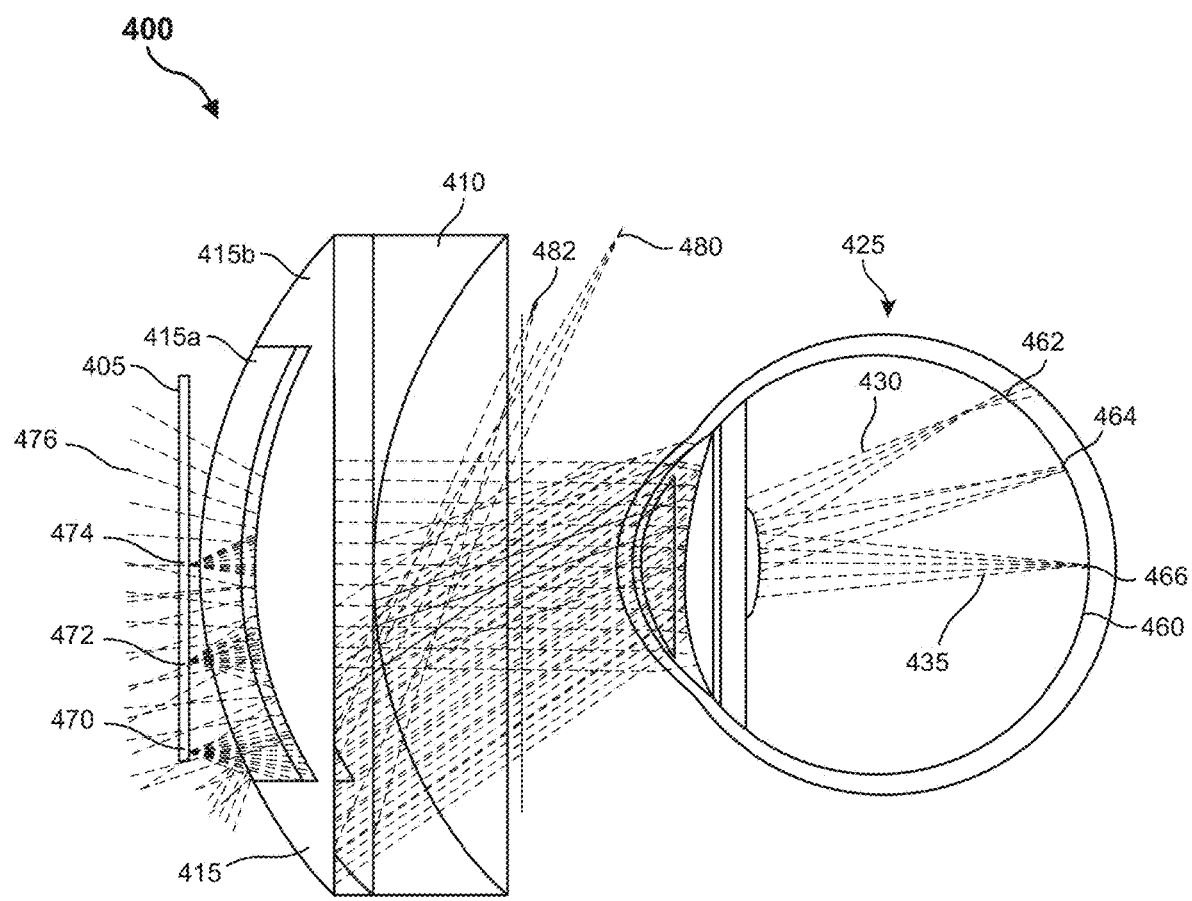
FIG. 4 is an illustration of an apparatus similar to that shown in FIG. 3, showing a possible path of an additional ray bundle.
Figure 5:
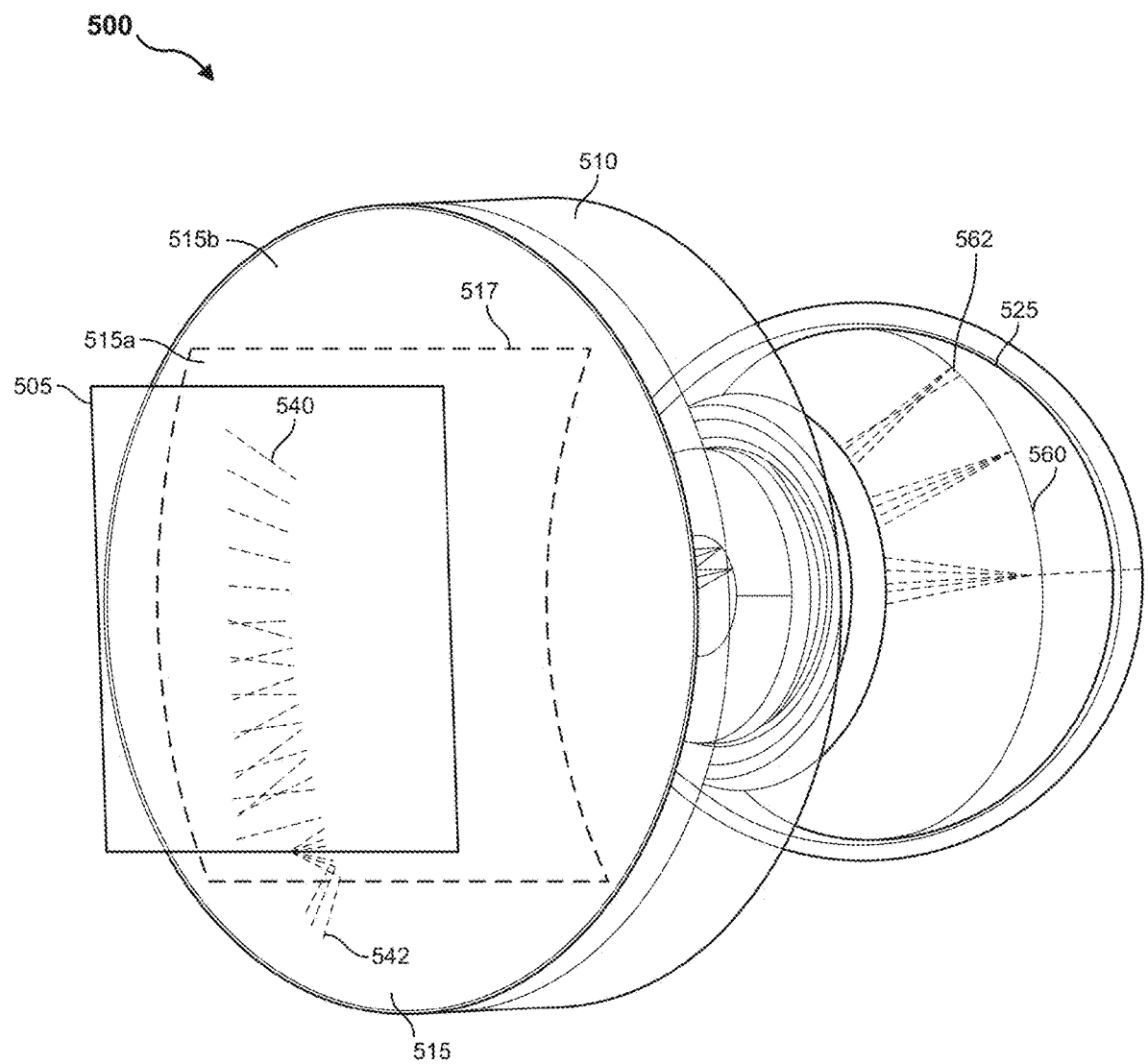
FIG. 5 is an alternative perspective view of an apparatus similar to that shown in FIGS. 3 and 4.
Figure 12:
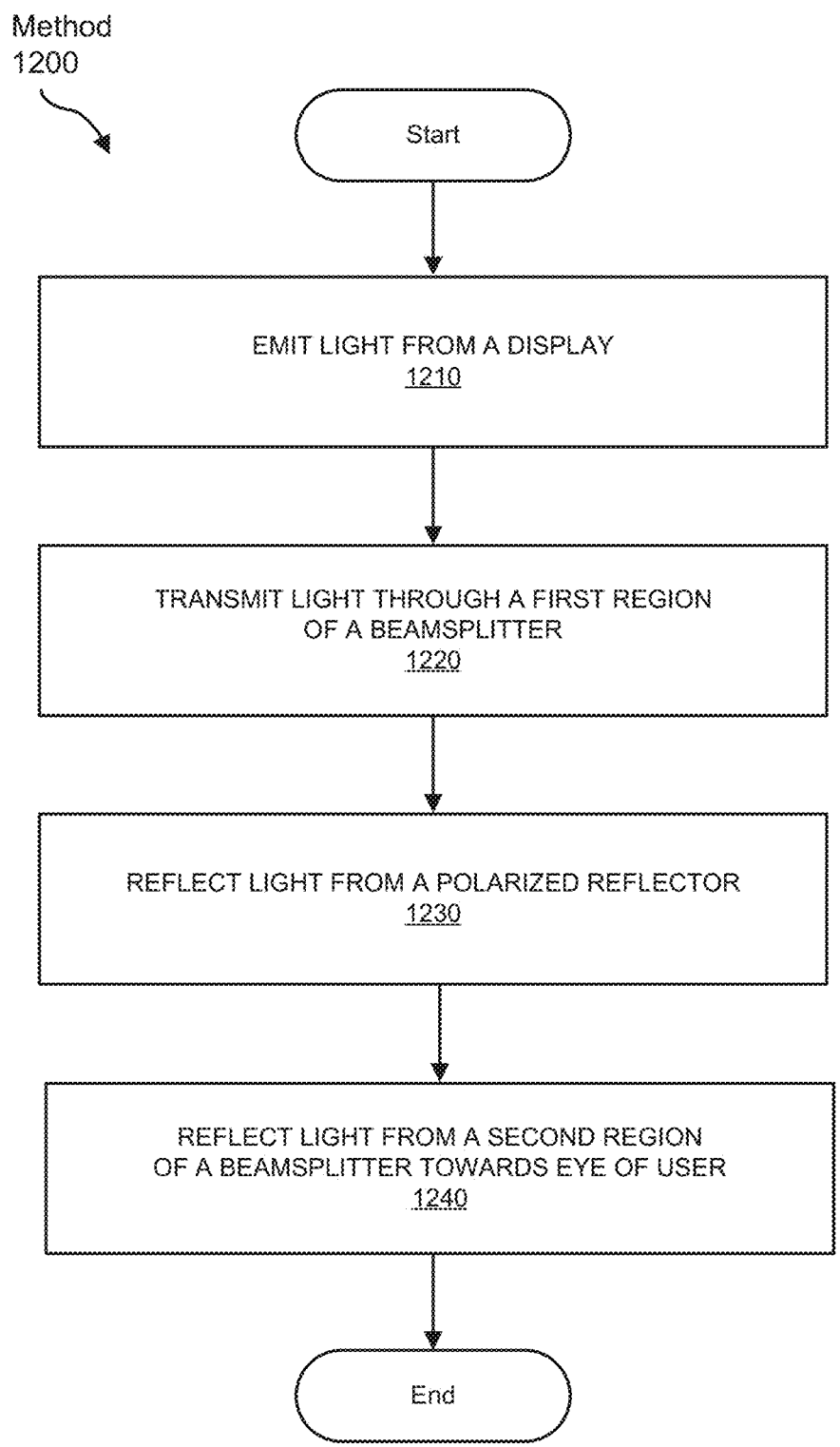
FIGS. 12 and 13 illustrate example methods of operation
Figure 13:
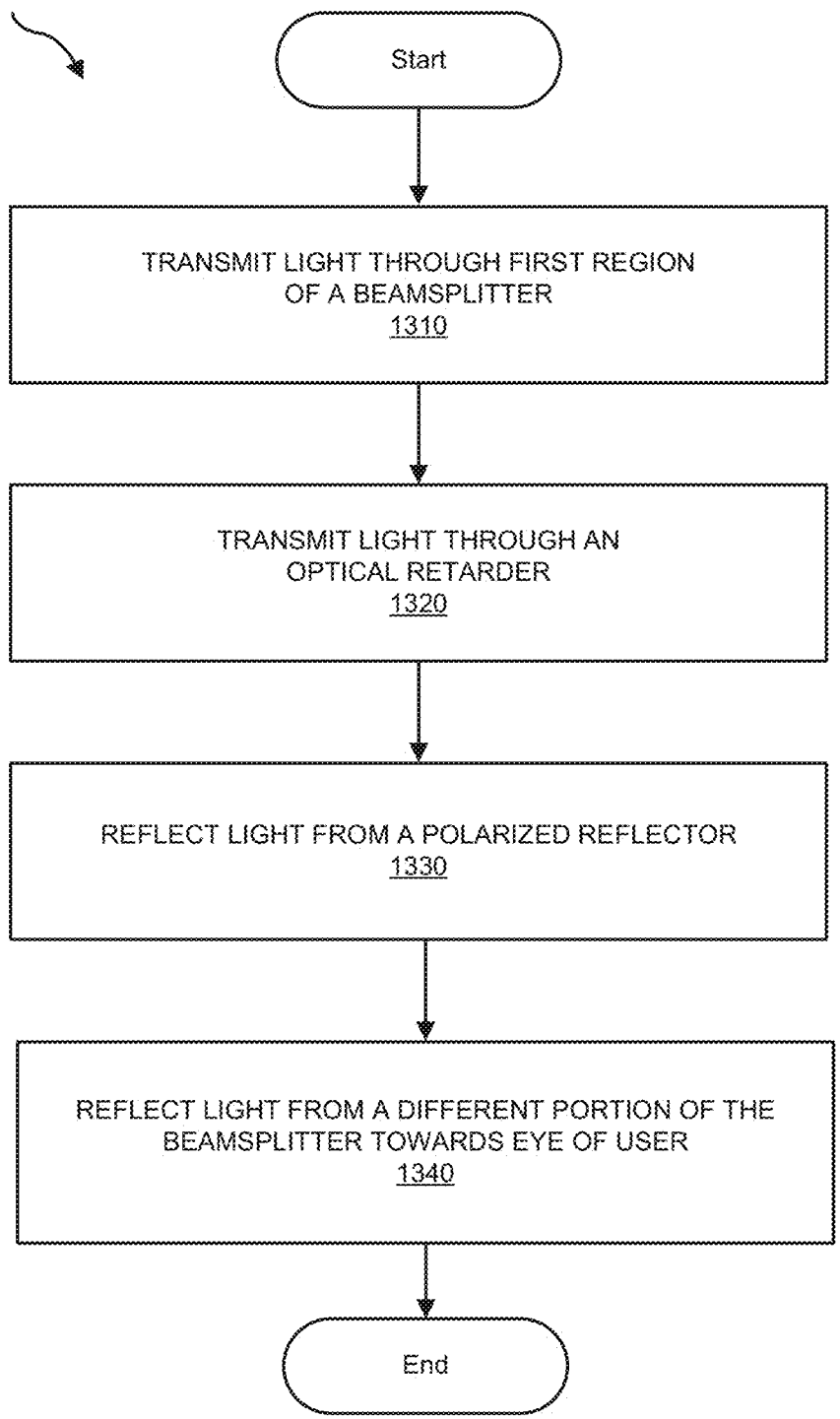
Figure 14:
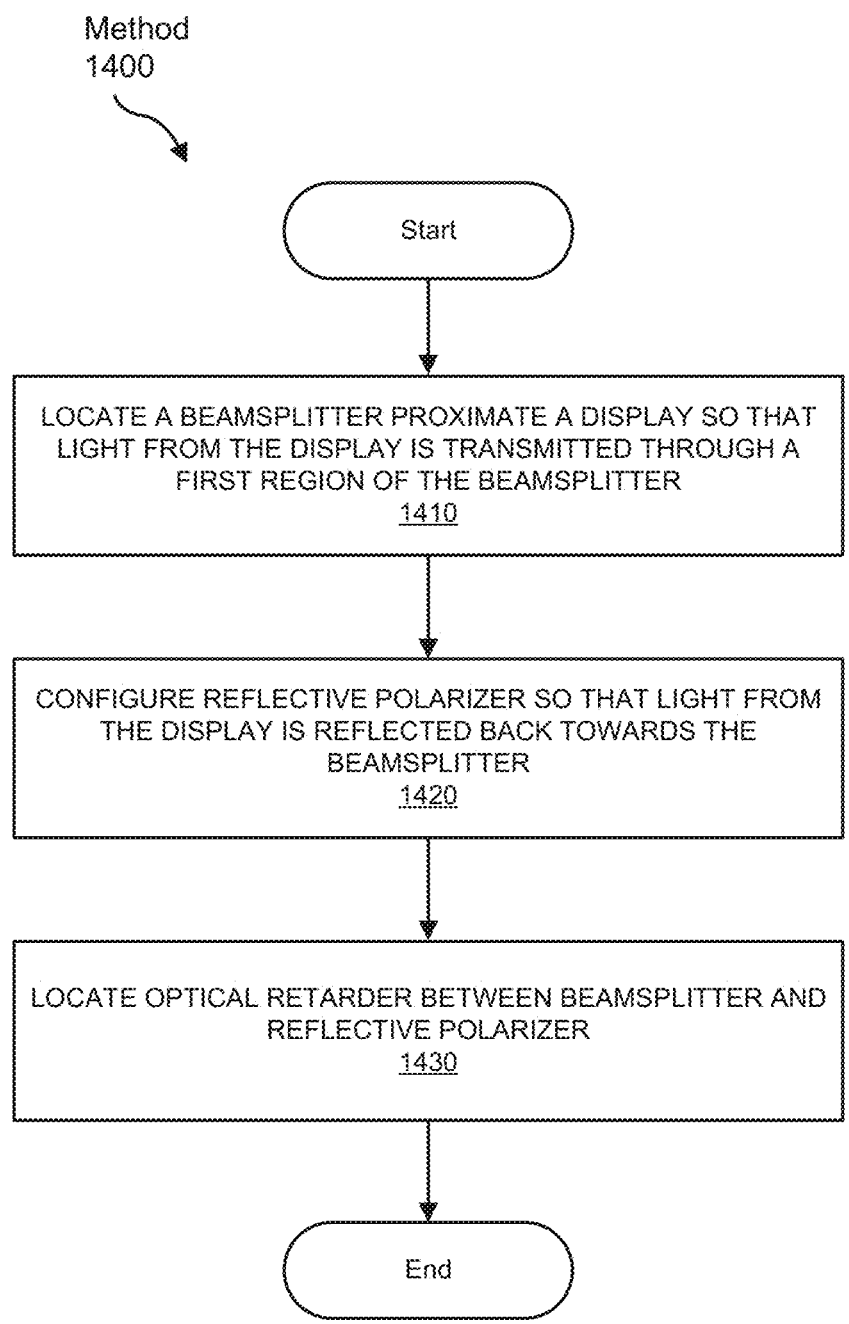
FIG. 14 illustrates an example method of device fabrication.
Figure 15:
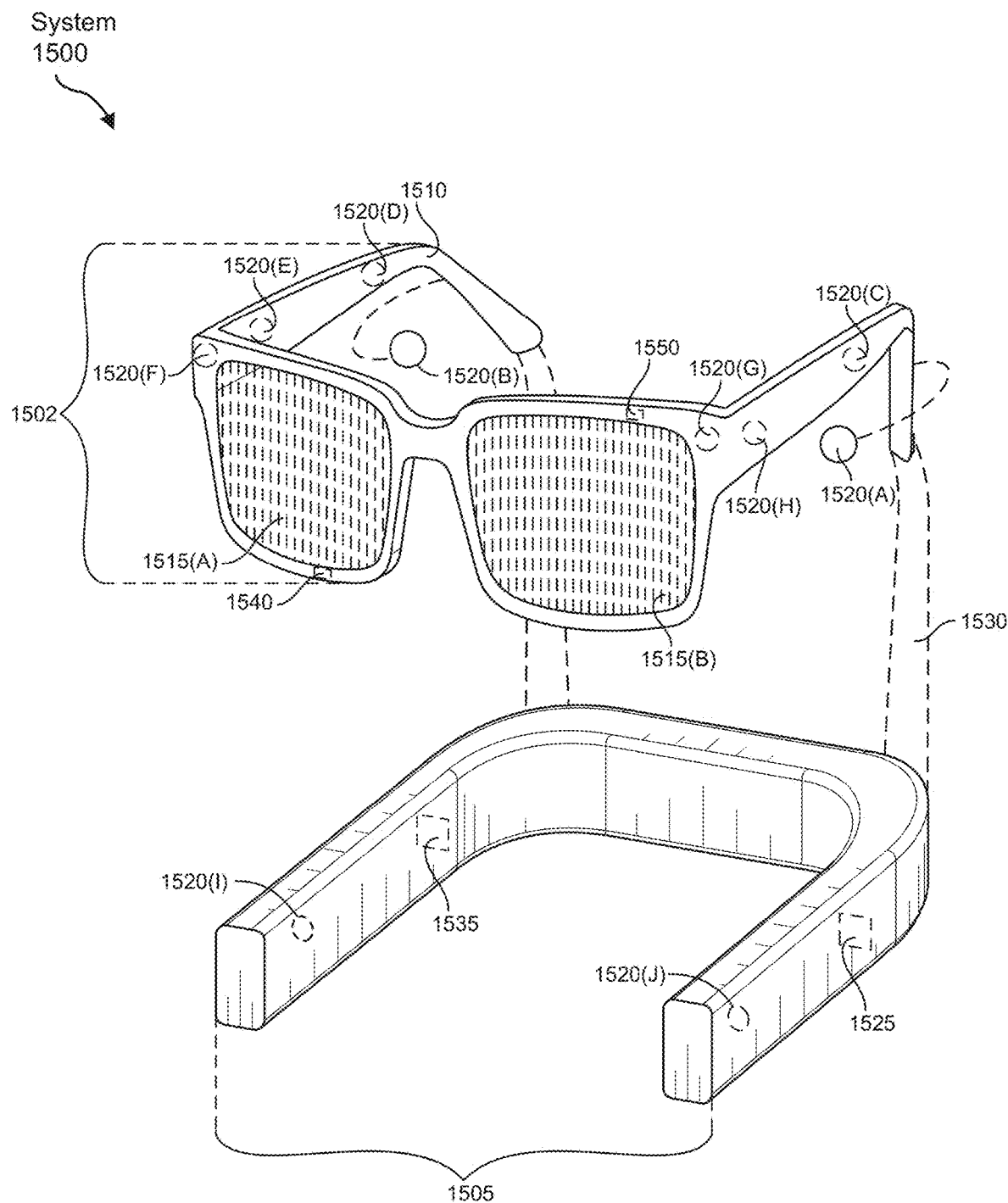
FIG. 15 is an illustration of exemplary augmented-reality glasses that may be used in connection with embodiments of this disclosure.
Figure 16:
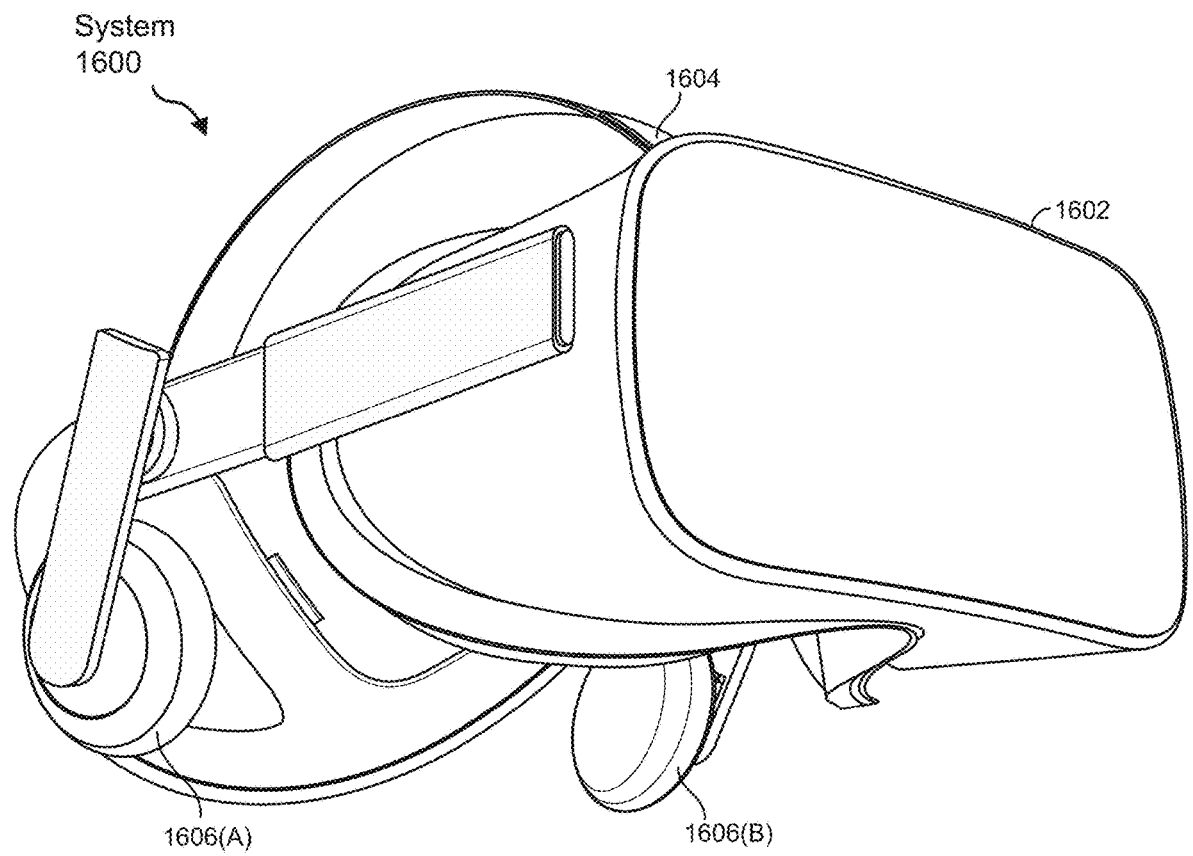
FIG. 16 is an illustration of an exemplary virtual-reality headset that may be used in connection with embodiments of this disclosure.
Figure 17:
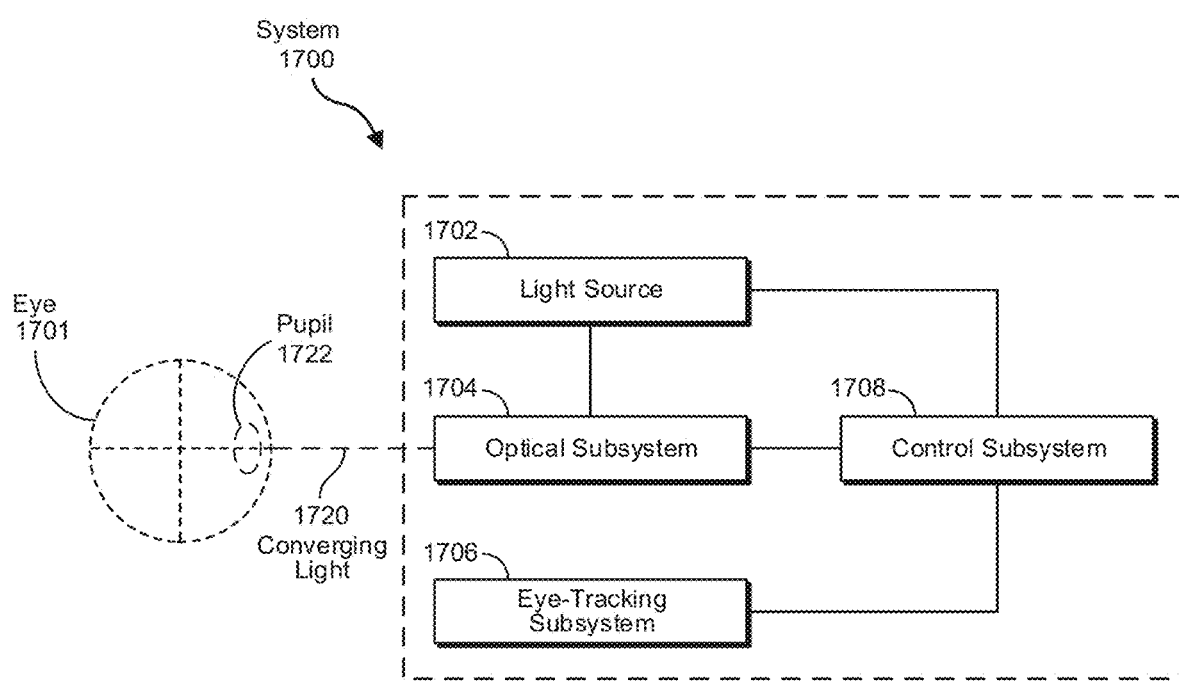
FIG. 17 an illustration of an exemplary system that incorporates an eye-tracking subsystem capable of tracking one or both of the user's eyes.

The following provides, with reference to FIGS. 1-18, detailed descriptions of example embodiments. FIGS. 1-2 show an example display and imaging system and example ray paths. FIGS. 3-5 show a combination of a display and a folded optic configuration including possible ray paths. FIGS. 6-10 illustrate example retinal images, showing the effect of a varying gaze angle. FIGS. 11A-11E show representative reflectance profiles for example beamsplitters. FIGS. 12-14 illustrate example methods of operation and device fabrication. FIGS. 15-16 show example augmented reality and virtual reality systems, and FIGS. 17-18B show example eye-tracking systems.

In some examples, a folded optic configuration may include a pancake lens. In this context, a pancake lens may include a lens and a beamsplitter, and may also be referred to as a beamsplitter lens. The beamsplitter may include a coating formed on a surface of the lens, such as a metal coating. In some examples, the reflectance of the beamsplitter may vary as a function of spatial position within the beamsplitter. For example, a beamsplitter may include a first region having a first reflectance and a second region having a second reflectance. In some examples, a beamsplitter may have a higher reflectance toward the edges of the beamsplitter (e.g., in a second region) than within a central region of the beamsplitter (e.g., within a first region).

Examples include an apparatus including a folded optic configuration, such as an apparatus including a pancake lens, that may include one or more of the following aspects: improved image uniformity (e.g., improved brightness uniformity and/or improved resolution), increased lens efficiency, reduced power consumption, and/or reduced heat generation. Examples also include associated methods, such as methods of fabrication or device use. In some examples, an apparatus may include a polarization-converting beamsplitter lens and a beamsplitter that has a higher reflectance toward the edges than within a central region.

In some examples, an apparatus may include a display configured to provide polarized light, such as circularly polarized light. A display may include an emissive display (e.g., a light-emitting display) or a display (e.g., a liquid crystal display) used in combination with a backlight.

FIG. 1 shows an apparatus 100, including display 105, beamsplitter 115 (including first region 115*a* and second region 115*b*), retarder 120 (e.g., a quarter-wave retarder), and a reflective polarizer 125. The apparatus 100 may be configured to project an image from display 105 onto an eye 130 of a user. In some examples, a display 105 may be configured to provide polarized light that may transmit through the first region of the beamsplitter, transmit through the retarder 120, reflect from the reflective polarizer 125, transmit through the retarder a second time, reflect from the beamsplitter, transmit through the optical retarder again, and transmit through the reflective polarizer to form an image of the display at the eye 130 of the user.

In some examples, display 105 may emit rays, such as ray 110, having a first circular polarization. The ray 110 may be incident on the beamsplitter 115, such as on the first region 115*a*, and the ray 110 may be partially transmitted through the beamsplitter 115. The ray 110 may then pass through retarder 120 (e.g., a quarter wave retarder). If the display emits circularly polarized light, retarder 120 may convert the polarization state of ray 110 from a first circular polarization to a first linear polarization. In some examples, ray 110 (having the first linear polarization) is then incident on linear reflective polarizer 125, and reflected by the linear reflective polarizer 125. Ray 110 may then pass through retarder 120 again, and the polarization state of ray 110 may be converted back to the first circular polarization by retarder 120. Ray 110 may then at least partially reflect off of the beamsplitter 115, in some examples, from the second region 115*b*. For example, ray 110 may be at least partially reflected from first region 115*a* of beamsplitter 115, or, depending on the direction of ray 110, may reflect from the second region 115*b*. The reflection of ray 110 may reverse the handedness of the circular polarization of ray 110 to a second circular polarization. Ray 110, having the second circular polarization after the reflection, may then pass through the retarder 120 and the polarization state of ray 110 may then be converted to a second linear polarization. Ray 110, having the second linear polarization, may then be transmitted by the linear reflective polarizer 125 towards the eye of a user. The linear reflective polarizer 125 may be configured to reflect the first linear polarization of light and transmit the second linear polarization of light.

In some examples, the display may emit linear polarized light and the optical retarder may convert the linear polarization to an orthogonal linear polarization. In some examples, the combination of retarder 120 and linear reflective polarizer 125 may be replaced with an alternative configuration, such as a cholesteric liquid crystal reflective polarizer.

FIG. 2 shows the path of a ray 210 through an apparatus 200 that may have an optical configuration similar to that of apparatus 100 described above in relation to FIG. 1, and uses similar element numbering. In this example, ray 210 is reflected by the second region 115*b* towards the eye of the user. The second region 115*b* may have a higher reflectance than the second region 115*a* of beamsplitter 115.

FIGS. 1 and 2 show the second region 115*b* as including a second layer 118. In some examples, the second region of the beamsplitter may include one or more additional reflective layers such as second layer 118. In some examples, the first and second regions of the beamsplitter may include only one layer that may vary in reflectance and may, for example, have a spatial variation in one or more of thickness or composition. In some examples, the beamsplitter may include a layer that varies in thickness and/or composition. First and second regions 115*a* and 115*b* (respectively) of beamsplitter 115 are illustrated as having different thicknesses. This is for the purpose of illustration since, in some examples, the first and second regions 115*a* and 115*b* may have similar thicknesses.

FIG. 3 shows an example apparatus 300 including a display 305 and a folded optic configuration including a beamsplitter lens 310. The beamsplitter lens 310 includes a lens 318 and a beamsplitter 315 having a first region 315*a* and a second region 315*b*. The first region 315*a* may be partially reflective and partially transmissive, for example, having an optical transmission of at least 25% for at least one visible wavelength. The second region 315*b* may be a highly reflective region, and may have an optical transmission of less than 20% for at least one visible wavelength. In some examples, display 305 generates light rays (sometimes referred to as rays), such as peripheral rays 330 and central rays 335, which are received by the eye 370 to produce an image of the display 305 on the retina 360 of eye 370. Central rays 335 are incident on the retina 360 of eye 370 at first retina portion 362. Peripheral rays 330 are incident on the retina 360 at second retina portion 364.

An example beamsplitter 315 may include one or more reflective layers. The beamsplitter may include first and second regions, 315*a* and 315*b* respectively, having different reflectance (e.g., for visible light or at least one visible wavelength of light). In some examples, first region 315*a* may have 50% transmission and 50% reflectance, and second region 315*b* may have a reflectance of at least 90%, for example, approximately 100%. If the reflective polarizer has close to 100% efficiency, the image system may have a 25% efficiency for imaging circularly polarized light from display 305 for rays such as central rays 335. The image system may have a 50% imaging efficiency for imaging rays such as peripheral rays 330. The transition 317 between first region 315a and second region 315b may be discontinuous or gradual, as discussed further below.

Light emitted from the display 305 may pass through the first region of the beamsplitter 315a and be reflected back towards the beamsplitter by reflective polarizer 325. Central rays 335 from a central portion 307 of the display 305 may be reflected by the reflective polarizer 325 back towards the first region 315a of the beamsplitter 315 and then reflected back towards the eye of the user through the reflective polarizer. Peripheral rays 330 from a peripheral (edge) portion 309 of the display 305 may be reflected by the reflective polarizer 325 back towards the second region 315b of the beamsplitter 315 and then reflected back towards the eye of the user through the reflective polarizer. If the reflectance of the second region 315b is greater than that of the first region 315a, this may increase the efficiency of the light path from the edge of the display to the retina relative to the efficiency of the light path from the center of the display to the retina. This may compensate for brightness reductions (from any other cause) for the edges of the display image.

In some examples, the beamsplitter 315 may include a metal coating on the surface of lens 318. The figure may not be to scale, and the display 305 may be further away from the beamsplitter lens than suggested by the figure. In some examples, the second region 315b of the beamsplitter 315 may extend over a region of the beamsplitter outside of the extent of the display.

In some examples, the beamsplitter may be formed on a convex (e.g., as illustrated), planar, or concave surface of a lens.

FIG. 4 shows an illustration of an apparatus 400 similar to that shown in FIG. 3 further showing possible paths of light rays. The figure is for illustrative purposes only and the apparatus is more clearly shown in FIG. 3. Apparatus 400 includes a display 405 and a beamsplitter lens 410. The beamsplitter lens 410 includes a beamsplitter 415 having a first region 415a and a second region 415b. The reflectance of the second region may be appreciably greater than that of the second region, for example, at least 10% greater, such as at least 20% greater, such as at least 30% greater. The second region 415b may include a highly reflective region. A highly reflective region may have a reflectance greater than 90%. In this example, the display 405 generates rays, such as ray bundles 430 and ray 435, which are received by the eye 425 to produce an image of the display 405. For example, peripheral portion 470 of the display 405 may produce ray bundle 430 that is incident on the retina and brought to an approximate focus at retina portion 462. The focus of ray bundle 430 on the retina may be improved using adjustment of the optical properties (e.g., optical power, astigmatism, and the like) of components of the optical configuration or by including vision corrective optical elements in the optical configuration.

Light rays are incident on the retina 460 of the eye 425 at retina portions 462, 464, and 466. Light rays are shown emitted from different portions of the display 405 at peripheral portion 470, intermediate portion 472, and central portion 474. Some light rays 476 from the display are reflected back from the beamsplitter and may be lost. Further light rays 480 and 482 may not follow an optical path to the eye 425 and may be lost, reducing optical efficiency of the light path.

FIG. 5 further illustrates an apparatus similar to that shown in FIGS. 3 and 4. The apparatus 500 includes display 505 and beamsplitter lens 510 including beamsplitter 515 having first region 515a and second region 515b. The display 505 is configured to emit light rays 540 incident on the first region 515a of beamsplitter 515, with some rays 542 being reflected. Rays such as ray bundle 562 are incident and brought to at least an approximate focus on the retina 560 of eye 525.

The first region 515a of beamsplitter 515 may have a rectangular (or square) shaped periphery 517 (shown as a dashed line). The first region 515a may be enclosed within and surrounded by the second region 515b with a reflectivity step or transition region at the periphery 517 between the first region 515a and the second region 515b.

In some examples, the first region of the beamsplitter may be rectangular (e.g., square) and may have a periphery with approximately the same aspect ratio and/or dimensions as the display. For example, the height:width ratio may be 1:1 for a square first region. The first region may have an edge dimension (e.g., height or width) approximately equal to or slightly greater than the corresponding edge dimension of the display. For example, the first region may have an edge dimension that is a multiple of between 0.9 and 1.2 times that of the corresponding display dimension. For example, the periphery of the first region (e.g., periphery 517 in FIG. 5) may have approximately the same dimensions and/or aspect ratio as the display (e.g., display 505 in FIG. 5).

Figure 6A:
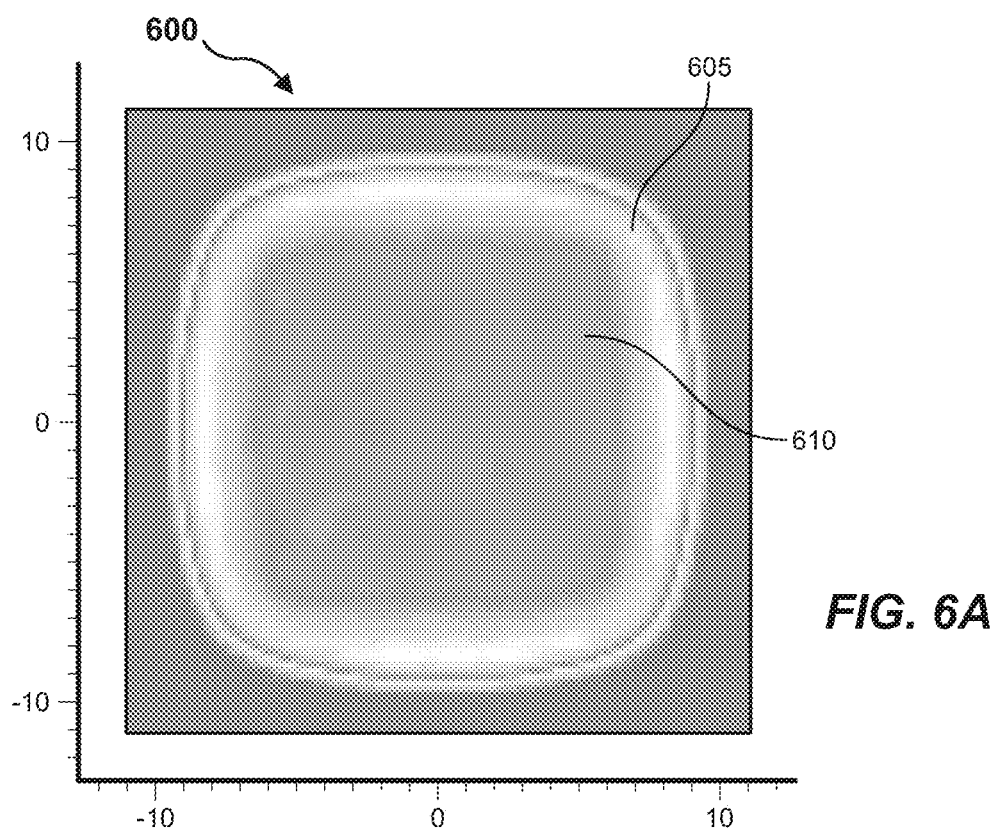
FIGS. 6A and 6B is an illustration of an example retinal image produced by an apparatus similar to that shown in FIG. 3.

FIG. 6A shows an illustration 600 of the display image 605 formed on the retina 610. The image may be shown on a display, for example, using an apparatus such as that illustrated in FIGS. 3, 4, and 5. Referring to an apparatus such as shown in FIG. 3, the display used to show the image may have dimensions of 20 mm by 20 mm, and the first region 315a may have dimensions of 23 mm by 23 mm. The dimensions are exemplary, not limiting, and may be approximate.

Figure 6B:
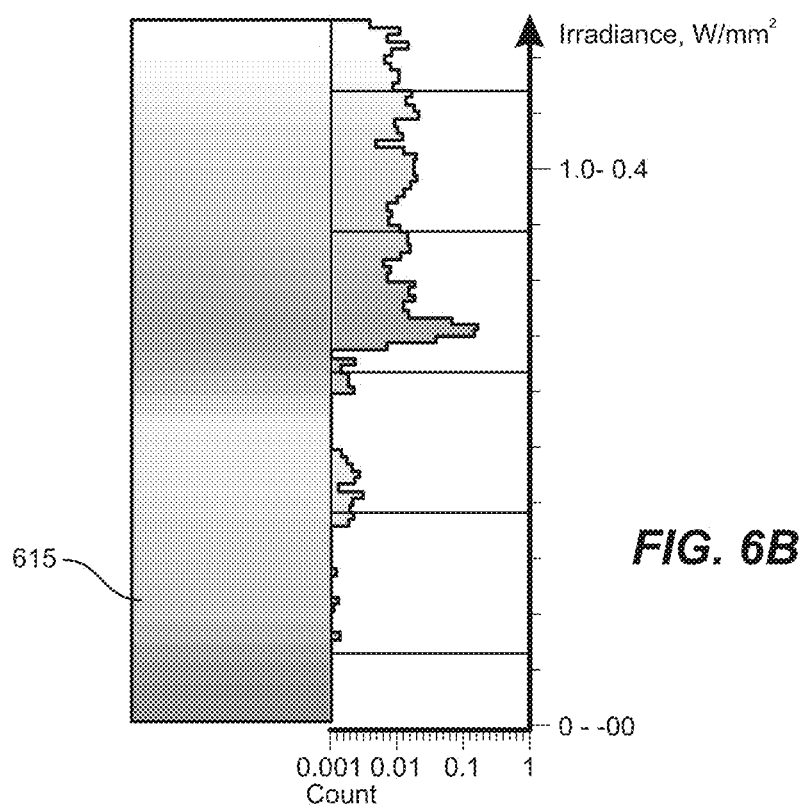

FIG. 6B shows a representation of the image intensity 615 as a function of position. The figure shows that, in some examples, the display may be more efficiently imaged by the beamsplitter lens toward the edges of the display and less efficiently imaged toward the center of the display. As such, light emission from the display can be reduced near the edges of the display, which may increase the energy efficiency of the apparatus.

Figure 7A:
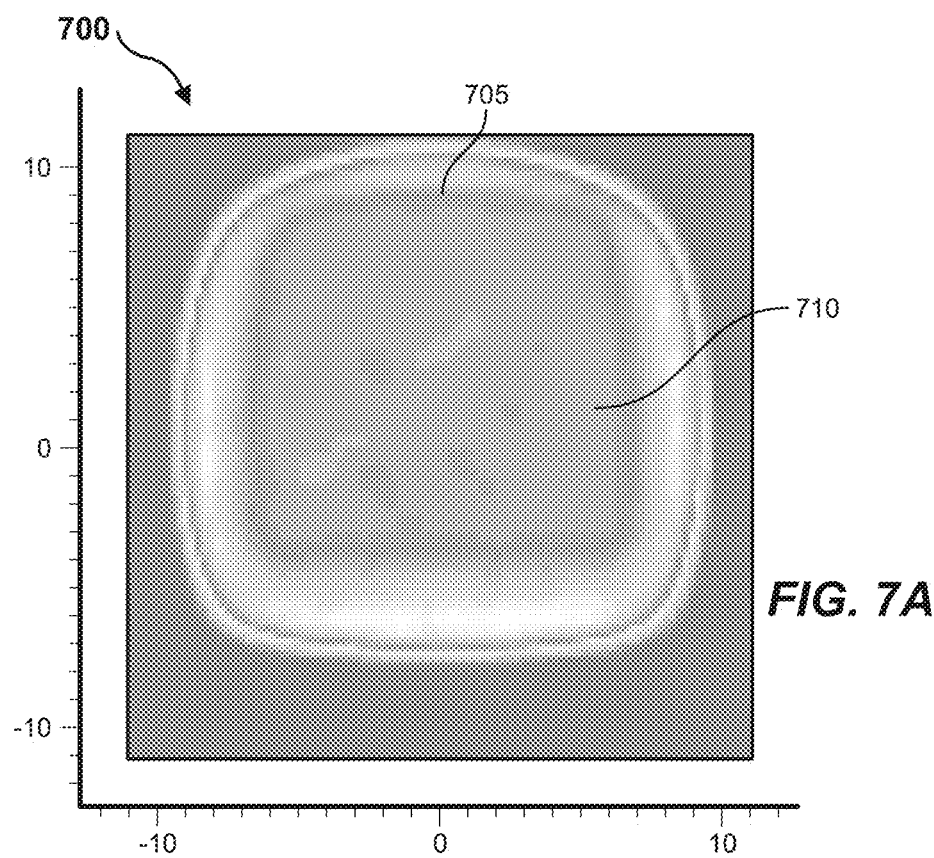
FIGS. 7A and 7B is an illustration of a retinal image produced by an apparatus configured to generate the retinal image of FIG. 6, where the eye gaze angle has moved downwards by 10°.

FIG. 7A shows an illustration 700 of the effect of the gaze angle of an eye moving downward at a 10° angle. The display image 705, formed on retina 710, is slightly displaced by the change in gaze angle. In some examples, an eye tracking system (including one or more of the eye tracking systems described below and illustrated in connection with FIGS. 13-14) may be incorporated within the disclosed systems to adjust the brightness of the display and produce the desired brightness profile for the image. Eye tracking systems may track a variety of properties and characteristics, including gaze angle, eye relief, eye convergence, and pupil diameter.

Figure 7B:
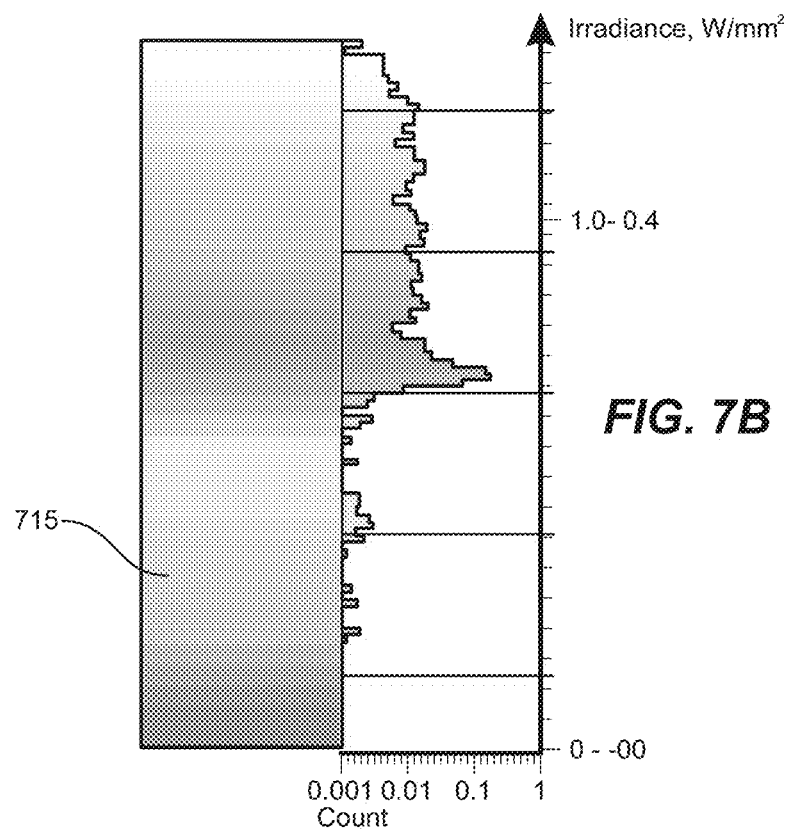

FIG. 7B shows a representation of the image intensity 715 as a function of position.

Figure 8A:
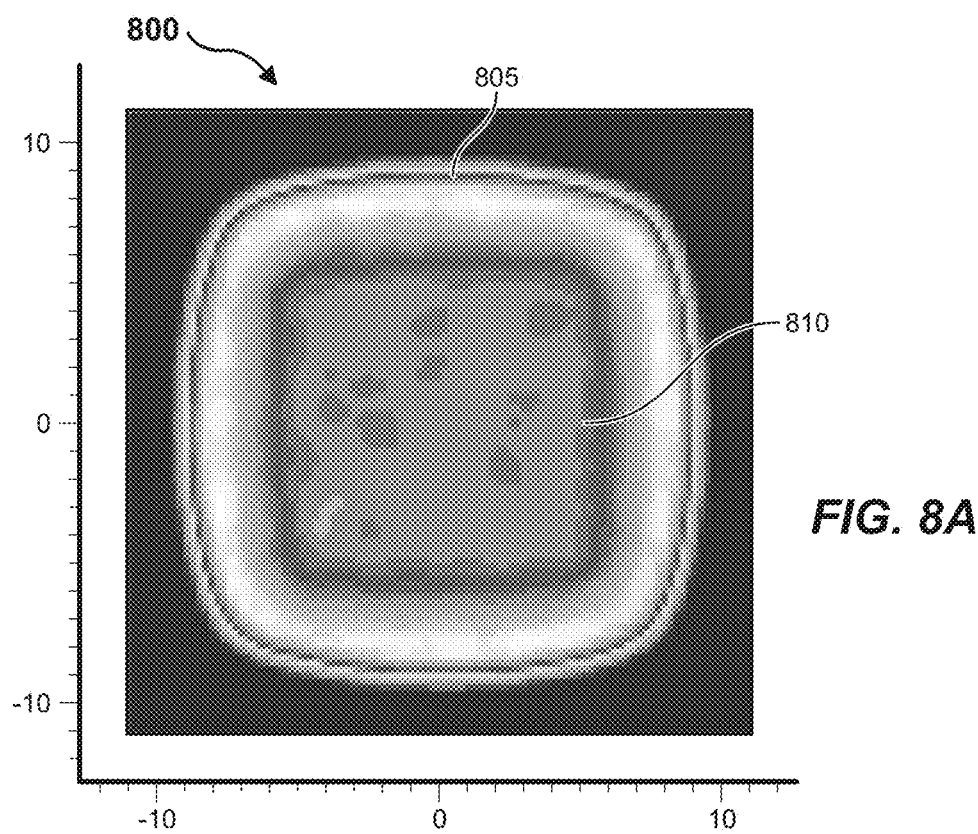
FIGS. 8A and 8B illustrate a retinal image produced by an example apparatus similar to that shown in FIG. 3, where the region 315a may be the same size as the display source.

FIG. 8A shows an illustration 800 of a display image 805 that may be formed on the retina 810 of a user. The image may be shown on a display, for example, using an apparatus such as that illustrated in FIGS. 3, 4, and 5. Referring to an apparatus such as shown in FIG. 3, the display used to show the image may have dimensions of 20 mm by 20 mm, and the first region 315a may have dimensions of 20 mm by 20 mm. The dimensions are exemplary, not limiting, and may be approximate. In this example, the dimensions of the first region 315a are the same as that of the display.

Figure 8B:
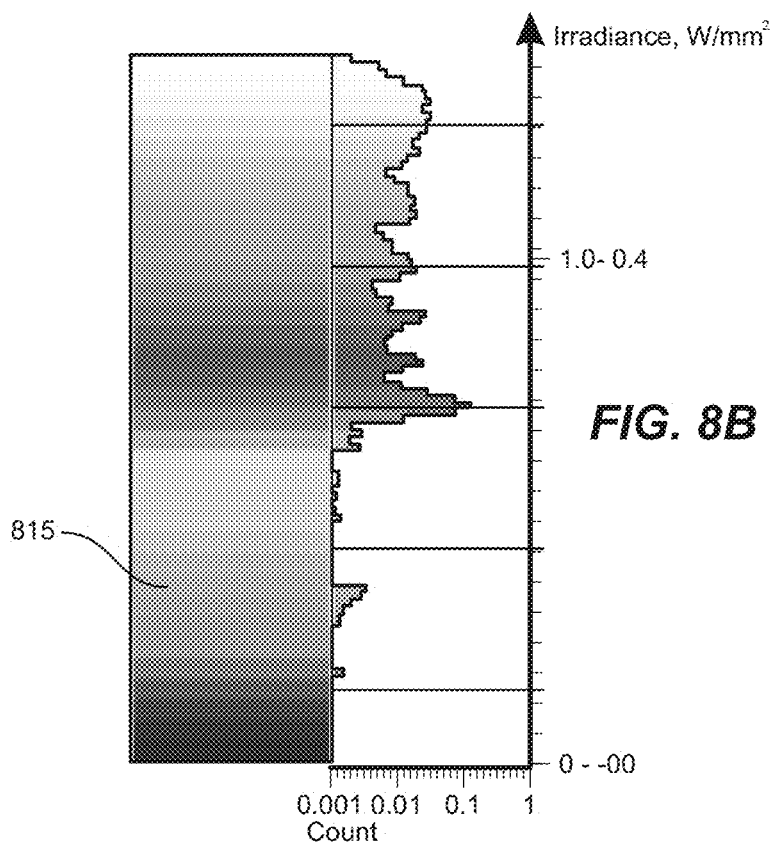

FIG. 8B shows a representation of the image intensity 815 as a function of position. As discussed above in relation to FIG. 6B, the edge portions of the display may be more efficiently imaged by the beamsplitter lens than the center of the display.

Figure 9A:
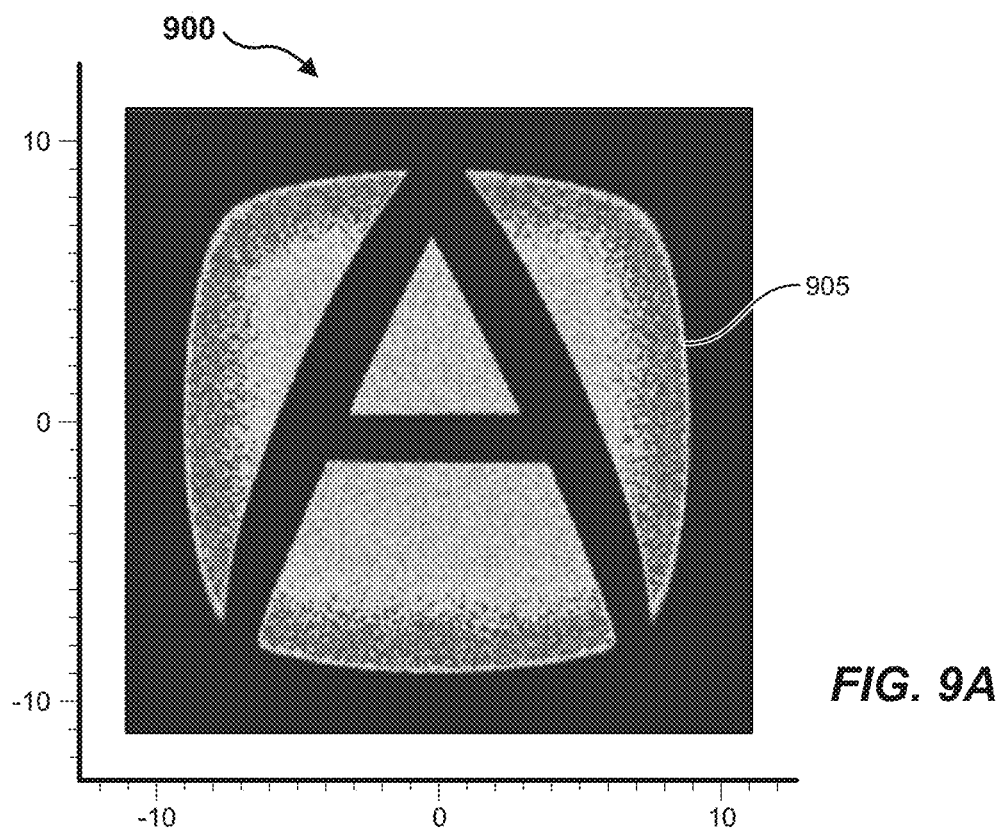
FIGS. 9A and 9B is an illustration of a retinal image produced by an apparatus configured to generate the retain image of FIG. 8, where the letter 'A' is generated by the display.

FIG. 9A shows an illustration 900 of a display image 905 that may be formed on the retina of a user. The letter 'A' shown on the display may be imaged on the retina by an apparatus such as described herein.

Figure 9B:
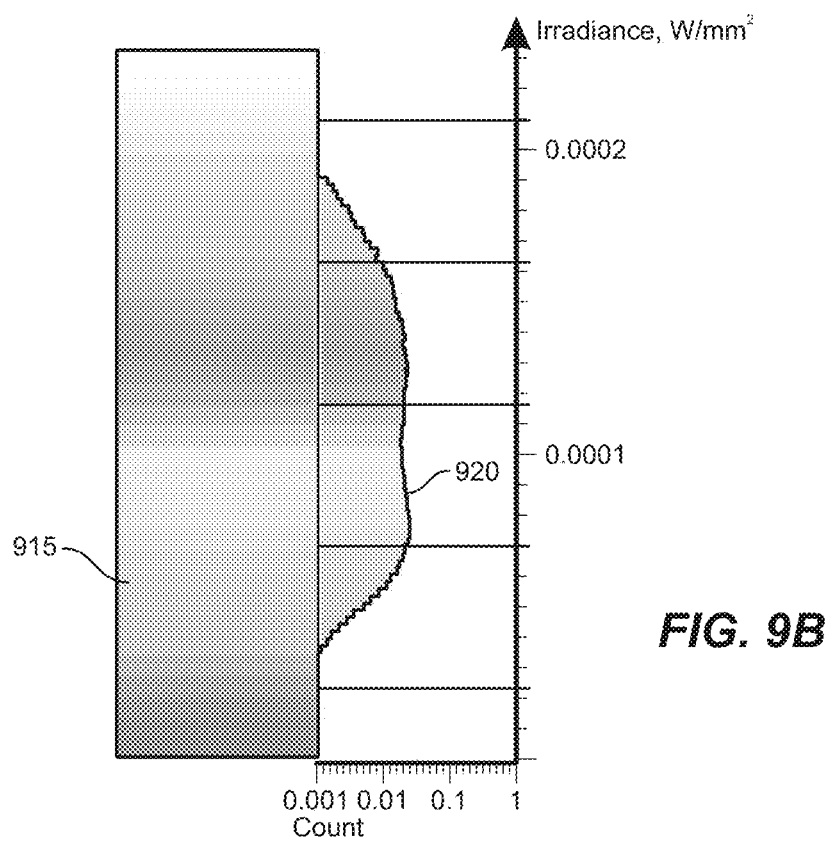

FIG. 9B shows a representation of the image intensity as a function of position, showing a qualitative shaded representation 915 of image intensity and a representation of intensity as, for example, a possible image sensor array count level histogram 920.

Figure 10A:
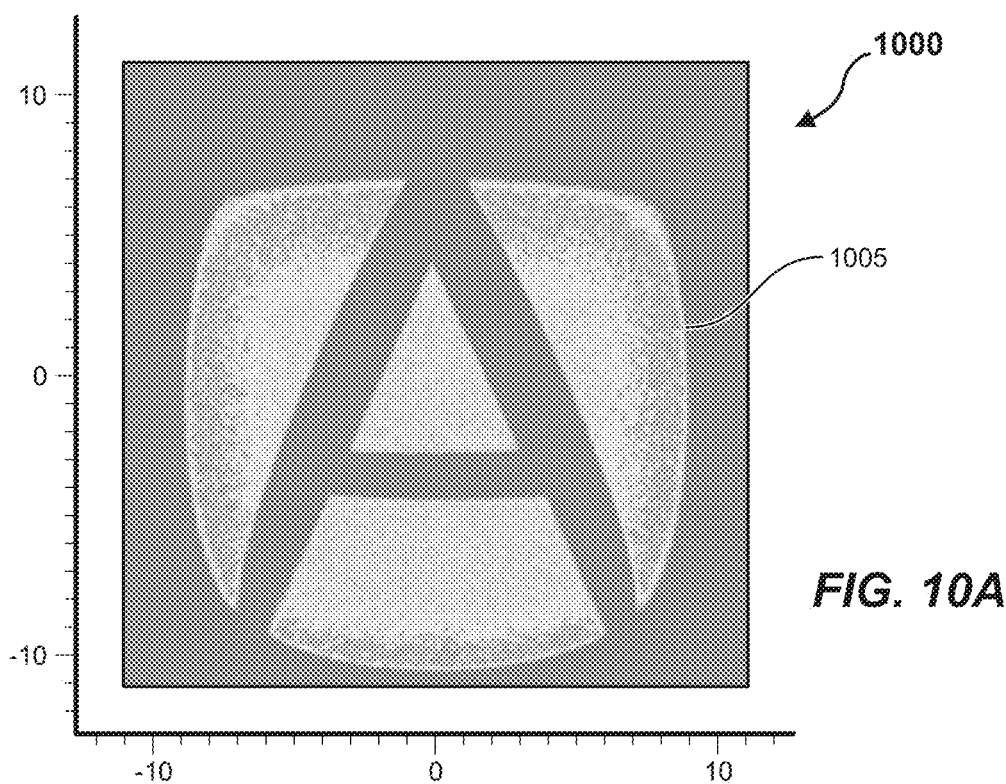
FIGS. 10A and 10B illustrate a retinal image produced by an apparatus configured to generate the image of FIG. 9, where the eye gaze angle has moved upwards by an angle of 10°.

FIG. 10A shows an image produced by an apparatus configured to generate the image of FIG. 9, where the eye gaze angle is 10° upwards. In this example, the illustrated image 1000 includes a image 1005 (based on the image shown on the display) that has some distortion, particularly near the edges of the image. This may be corrected by an apparatus including an eye tracker configured to determine the gaze angle and, optionally, other metrics, such as eye relief, and configured to use the gaze angle and/or other information to correct the image.

Figure 10B:
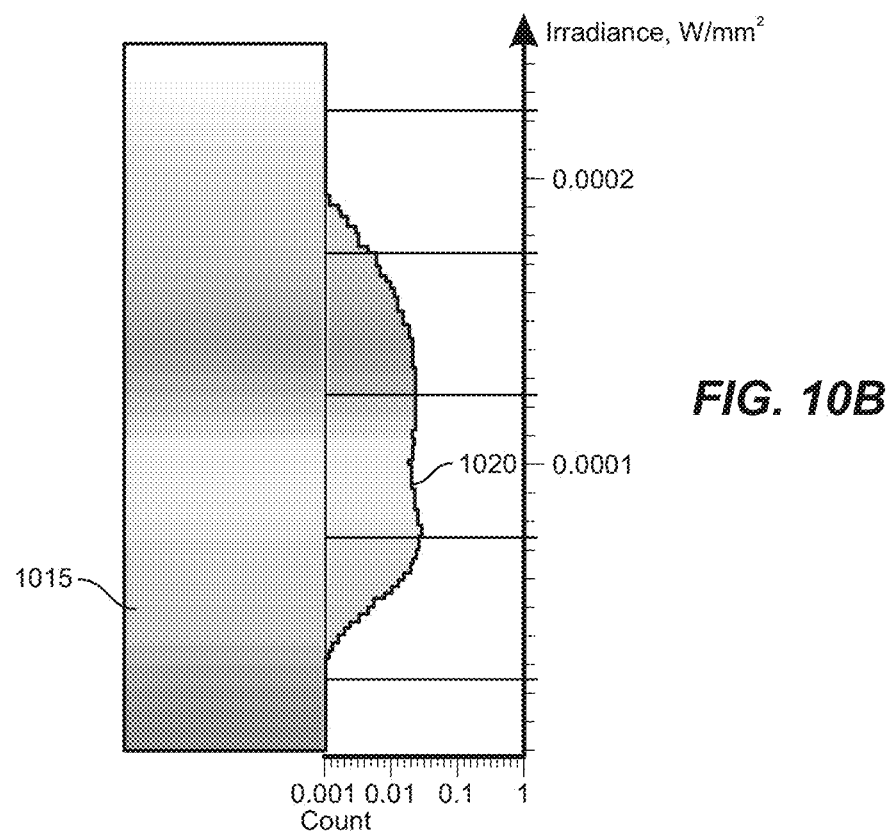

FIG. 10B shows a representation of the image intensity 1015 as a function of position. The edge portions 1020 of the display image may show effects of distortion that may be corrected using an eye tracker.

An example beamsplitter may include one or more regions having different transmissivity and/or reflectance, and may include one or more reflective layers. An example beamsplitter may include first and second regions, having a different reflectance, for example, for visible light or at least one visible wavelength of light.

Reflective layers may be formed by one or a combination of processes including thin film physical vapor deposition, chemical vapor deposition, or other suitable processes for depositing reflective layers, such as highly and/or partially reflective thin film coatings. An example reflective layer may include one or more metals such as aluminum or silver, and may be metallic. An example reflective layer may include one or more dielectric materials such as silica, aluminum oxide, hafnium oxide, titanium dioxide, magnesium oxide, magnesium fluoride, indium tin oxide, indium gallium zinc oxide, and the like, and mixtures thereof. An example reflective layer may include one or more dielectric layers, and may include a Bragg grating structure or similar multilayer structure.

During fabrication of a beamsplitter, the first and second regions may be defined by masked deposition processes or photolithographically, or a combination thereof.

FIGS. 11A-11E show example variations of reflectance for a beamsplitter as a function of distance from a reference point, for example, a radial distance from an optical center or other reference point.

Figure 11A:
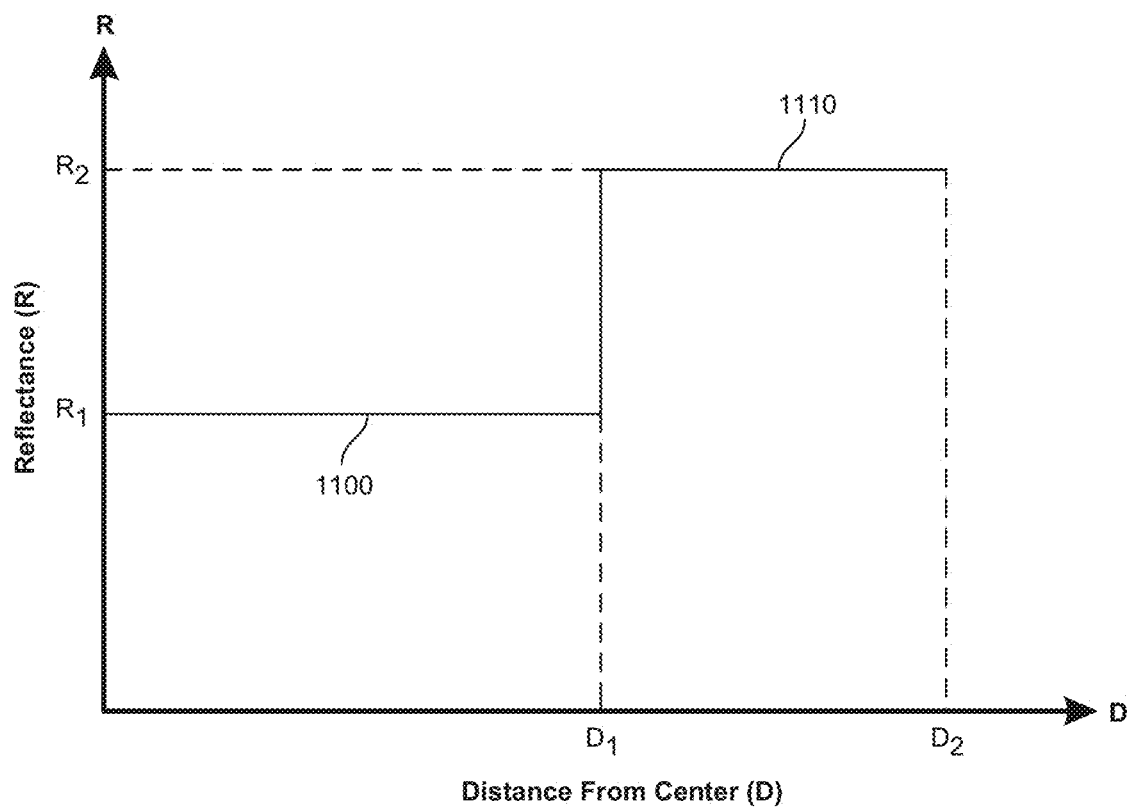
FIGS. 11A-11E show example spatial variations in reflectance for beamsplitters according to various examples.

FIG. 11A shows reflectance-distance relationship for a beamsplitter including a first region having a first reflectance 1100 (denoted $R_1$) and a second region having a second reflectance 1110 (denoted $R_2$). For a circular first region, the location of the transition from the first region to the second region (at transition distance $D_1$) may be constant and describe the radius of the first region. For a rectangular (e.g., square) first region, $D_1$ may vary with the angle along which the transition distance is measured, for example, being further from the optical center of a beamsplitter lens at the corners of a rectangular first region.

Figure 11B:
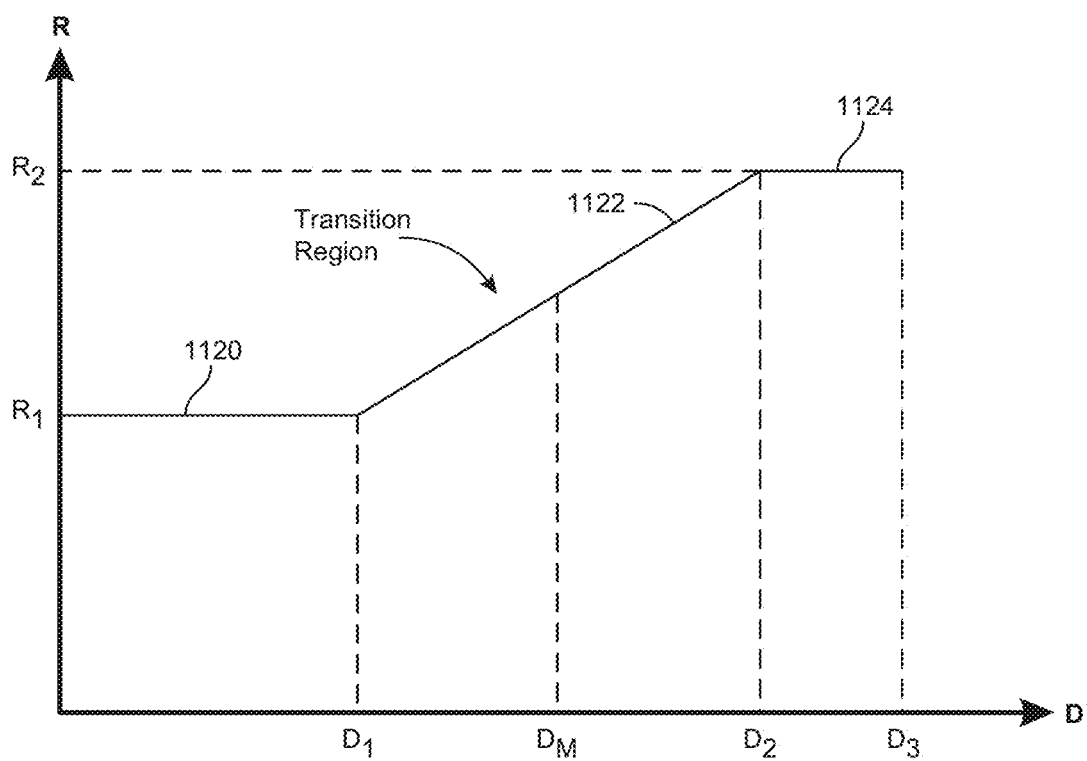

FIG. 11B shows reflectance-distance relationship for a beamsplitter including a first region having a first reflectance 1120 (denoted $R_1$), a second region having a second reflectance 1124 (denoted $R_2$), and a transition region 1122 having a reflectivity that varies as a linear function of distance (D) between the outer edge of the first region ($D_1$) and the inner edge of the second region ($D_2$). The outer edge of the second region may be located at distance $D_3$. The transition region may have an average (e.g., mean) location $D_M$ and an average reflectance $(D_1+D_2)/2$. The transition region is shown having a reflectance that varies linearly with distance but other relationships may be used, such as curved relationships. The transition region may have a width (which may also be referred to as a transition width or transition distance) of $D_2-D_1$. The transition region may have an average (e.g., mean) location $D_M$ which may be $(D_1+D_2)/2$, and may have an average reflectance $(R_1+R_2)/2$. The distance $D_3$ may represent the outer periphery of the beamsplitter or the inner periphery of one or more additional beamsplitter regions. In some examples, the distance D may represent a distance from the optical center of the beamsplitter along a particular direction that passes through the optical center. For example, D=0 may represent the optical center. This may be a radial distance for a generally circular first region (and, e.g., a toroidal second region), but may be a function of direction for other shapes of the first and second regions, for example, for a square or elliptical first region.

Figure 11C:
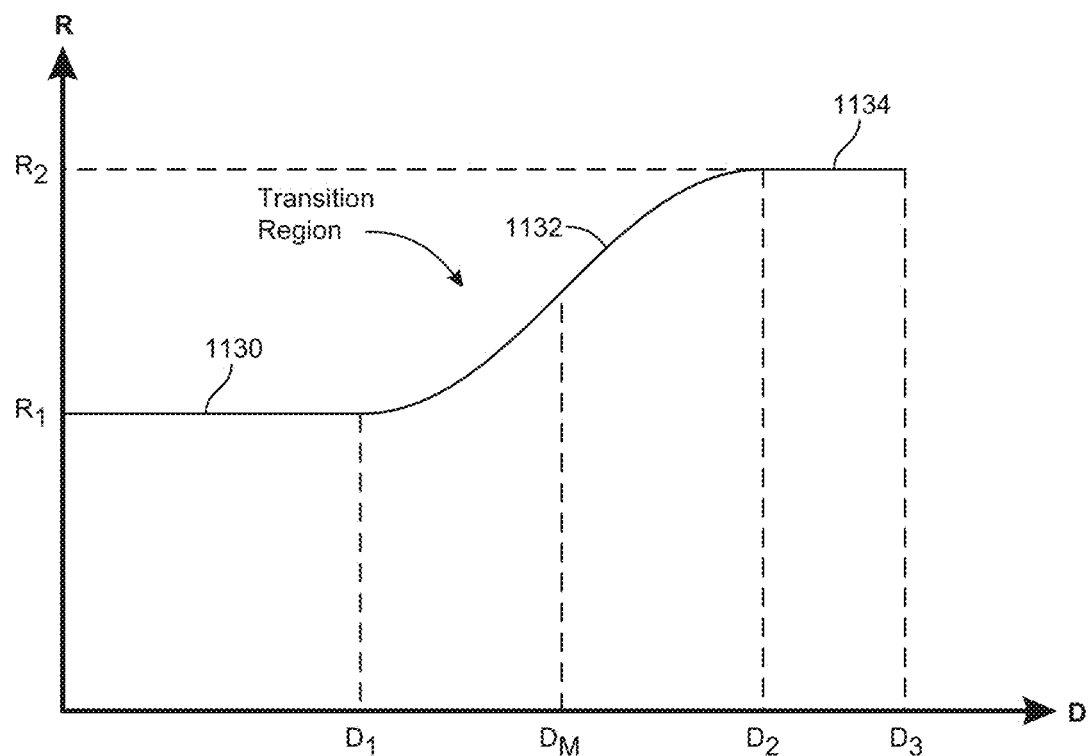

FIG. 11C shows reflectance-distance relationship for a beamsplitter including a first region having a first reflectance 1130 (denoted $R_1$), a second region having a second reflectance 1134 (denoted $R_2$), and a transition region 1132 having a reflectivity that varies as a non-linear function of distance (D) between the outer edge of the first region ($D_1$) and the inner edge of the second region ($D_2$). The outer edge of the second region may be located at distance $D_3$, which may represent the outer edge of the beamsplitter or the inner periphery of one or more additional beamsplitter regions having different values of reflectance. The transition region may have an average (e.g., mean) location $D_M$ which may be $(D_1+D_2)/2$, and may have an average reflectance $(R_1+R_2)/2$. In this example, the transition region is shown having a reflectance that has a curved relationship with distance though other relationships may be used.

Figure 11D:
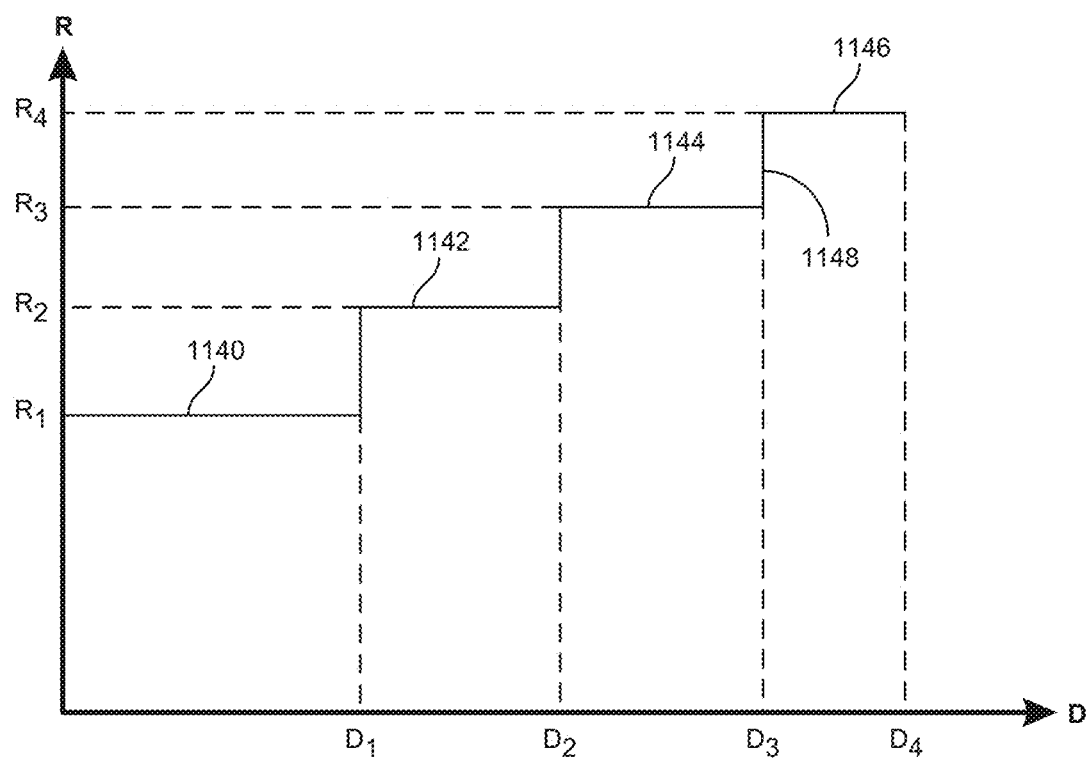

FIG. 11D shows a reflectance-distance relationship for a beamsplitter including a first region having a first reflectance 1140 ($R_1$), a second region having a second reflectance 1142 ($R_2$), a third region having a third reflectance 1144 ($R_3$), and a fourth region having a fourth reflectance 1146 ($R_4$). In some examples, the second region may be disposed around the first region, the third region may be disposed around the second region, etc. For circular regions, the regions may be concentric. The reflectance of each region may increase as the distance increases. For example, an outer region surrounding an inner region may have a higher reflectance than that of the inner region. The number of regions may be in the range of, for example, 2-10. In this example, the reflectance within a transition region (such as reflectance step 1148) may be discontinuous (e.g., a step as shown) or may vary with distance (e.g., increasing from the first reflectance to the second reflectance within a transition region).

Figure 11E:
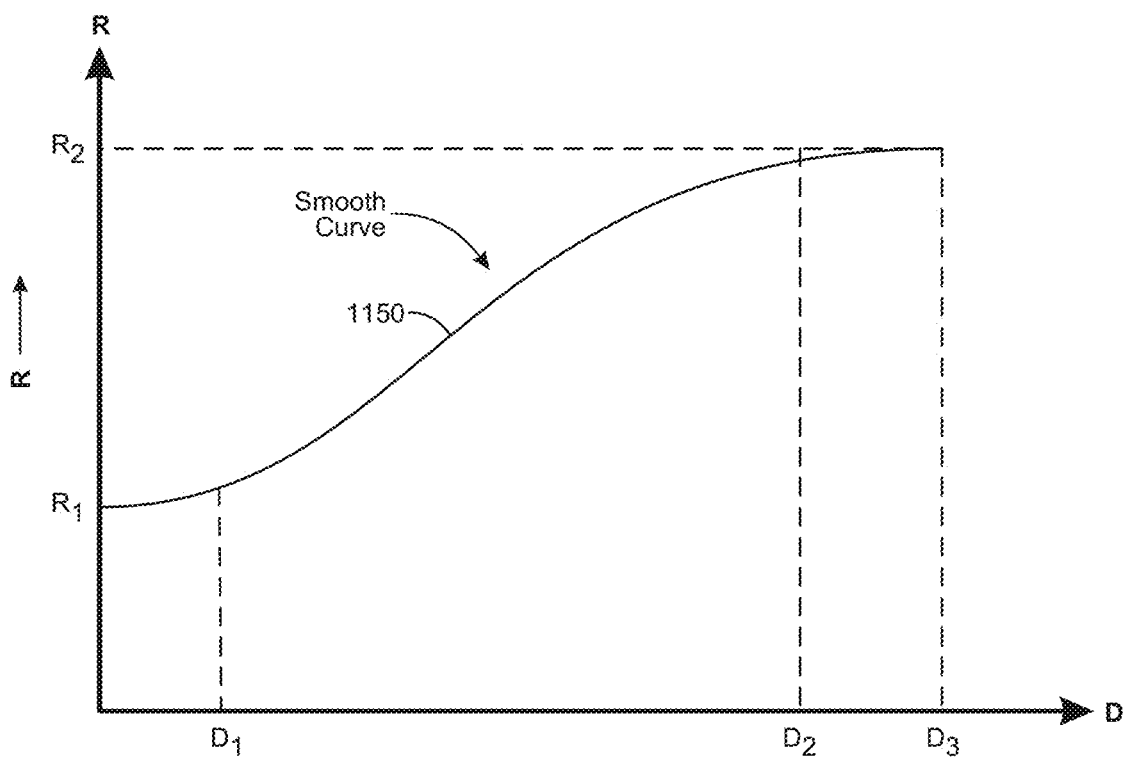

FIG. 11E a reflectance-distance relationship 1150 for a beamsplitter having a reflectance that increases with distance from, for example, the center of the beamsplitter. The reflectance may increase from a reflectance $R_1$ (e.g., at the center of the beamsplitter) to a reflectance $R_2$ (e.g., near an edge of the beamsplitter), where $R_1$ may be greater than $R_2$. In some examples, $R_1$ and $R_2$ may have different reflectance values, such as reflectance values discussed elsewhere in relation to beamsplitters such as those having a first region and a second region.

In some examples, the first region of a beamsplitter may be include a central portion of the beamsplitter (e.g., D in the range of zero to $D_1$) having a reflectance of approximately $R_1$, and the periphery of the beamsplitter may include a second region having a reflectance of approximately $R_2$ (e.g., D in the range of $D_2$ to $D_3$). A region may be considered as a portion of the beamsplitter over which the reflectance varies by less than approximately 10% (e.g., a variation in reflectance from approximately 90% to approximately 100%), or less than 5%.

In some examples, the relationship between reflectance and distance may be a monotonic smooth curve. In some examples, the relationship between reflectance and distance may be discontinuous or include transition regions with relatively high rates of change of reflectance.

An example beamsplitter may include at least a first and a second region, where the first region may include a central region of the beamsplitter, and the second region may include an outer region of the beamsplitter.

In some examples, the first region may have a reflectance of about 50% and a transmission of about 50%. In some examples, the first region may have a reflectance of about 45%, about 40%, about 35%, about 30%, other value, or within a range between any two different values of these example reflectance values. In some examples, the first region may have a transmission of about 70%, about 65%, about 60%, about 55%, about 50%, about 45%, about 40%, about 35%, about 30%, or a range between any two different values of these example transmission values.

In some examples, the second region may have a reflectance of about 100%, about 95%, about 90%, about 85%, about 80%, about 75%, about 70%, or within a range between any two different values of these example reflectance values. For example, the second region may have a reflectance between approximately 75% and approximately 100%, such as a reflectance between approximately 85% and approximately 100%.

In some examples, there may be a gradual transition in reflectance of the beamsplitter from the first region to the second region within a transition region. The transition region may have a width (which may be termed a transition distance) that may be less than about 5 mm, such as less than 2 mm, such as less than 1 mm. In some examples, the transition region width may be less than 0.1 mm, such as less than 0.01 mm.

A device may include a beamsplitter having a gradual or effectively discontinuous transition in the reflectance of the beamsplitter from the first region to the second region. A transition region may be located between the first region and the second region. As measured along a particular direction (e.g., a radial direction, normal to the periphery of the first region, or other direction) the transition region may extend over a transition distance between the first region and the second region. In some examples, the transition distance may have a length that is approximately or less than 5 mm, 1 mm, 0.1 mm, or 0.01 mm.

FIG. 12 shows an example method (1200) which may be performed, for example, by an apparatus such as a head-mounted device, such as an AR/VR device. The method may include emitting light (e.g., including one or more light rays) from a display (1210), transmitting the light through a first region of a beamsplitter (1220), reflecting the light from a reflective polarizer (1230), and reflecting the light from a second region of the beamsplitter (1240), where the second region has an appreciably greater reflectance for the light than the first region; for example, a second reflectance that is at least 20% greater. Light may be reflected from the second region of the beamsplitter towards an eye of a user, and may be transmitted through the reflective polarizer (e.g., due to polarization modification of the light due to reflection, an optical retarder, or some other effect or combination thereof). In some examples, light emitted from a central region of the display may be reflected from the first region of the beamsplitter and light emitted from an edge portion of the display may be reflected from the second region of the beamsplitter, for example, if a display has emission non-uniformity. The method 1200 may further include transmitting the light through the reflective polarizer towards an eye of a user. An optical retarder may be located between the beamsplitter and the reflective polarizer, and the light may pass through the retarder on a plurality of occasions (e.g., three times) before being transmitted through the reflective polarizer towards the eye of the user. In some examples, light may be emitted from the display with a circular polarization. The polarization may be modified by the optical retarder each time the light passes through the retarder. For example, light may be incident on the reflective polarizer with a first linear polarization, which may be reflected by the reflective polarizer. Light may reflect from the beamsplitter and may be incident again on the reflective polarizer with a second linear polarization which may be transmitted by the reflective polarizer.

FIG. 13 shows a further example method (1300) which may be performed, for example, by an apparatus such as a head-mounted device, such as an AR/VR device. The method may include transmitting light, such as circularly polarized light, through a first region of a beamsplitter (1310), transmitting the light through an optical retarder to convert the polarization of the light (e.g., convert from a circular polarization to a first linear polarization) (1320), reflecting the light from a reflective polarizer (1330, e.g., back through the optical retarder), and reflecting the light from the beamsplitter (1340), where light from different portions of the display are reflected from different regions of the beamsplitter. For example, light emitted from a central region of the display may be reflected from the first region of the beamsplitter and light emitted from an edge portion of the display may be reflected from a second region of the beamsplitter having a greater reflectivity than the first region, thereby imparting relatively greater brightness for edge portions of the image of the display formed by the apparatus and configured to be viewable by an eye of the user. The second region of the beamsplitter may have an appreciably greater reflectance (e.g., for one or more wavelengths of visible light) than the first region. The method may further include transmitting the light reflected from the second region through the reflective polarizer towards the eye of a user. In some examples, an optical retarder may be located between the beamsplitter and the reflective polarizer, and the light may pass through the retarder on a plurality of occasions (e.g., three times) in the optical path between the display and the eye of the user.

FIG. 14 shows an example method (1400) of fabricating an apparatus. The example method 1400 may include locating a beamsplitter proximate a display so that light from the display passes through a first region of the beamsplitter (1410), where the beamsplitter includes first and second regions and the reflectance of the second region is appreciably higher than the reflectance of the first region, configuring a reflective polarizer on the opposite side of the beamsplitter to the display (1420) so that the reflective polarizer reflects light from the display back towards the beamsplitter, and (optionally) locating an optical retarder between the beamsplitter and the reflective polarizer (1430). The apparatus may include a head-mounted device including the display, and an optical assembly including the beamsplitter, optical retarder, and reflective polarizer may be used to form an image of the display viewable by a wearer of the head mounted device.

In some examples, an apparatus includes folded optic configuration including a pancake lens (e.g., a combination of a lens and a beamsplitter, which may also be termed a beamsplitter lens) and a reflective polarizer. An example reflective polarizer may be configured to reflect a first polarization of light and transmit a second polarization of light. For example, a reflective polarizer may be configured to reflect one handedness of circularly polarized light (e.g., right or left) and transmit the other handedness of circularly polarized light (e.g., left or right, respectively).

Folded optic configurations may be compact, have a wide field-of-view (FOV), and provide higher resolution for a given distance between the display and a viewer. However, a folded optic configuration including a pancake lens may have a lower efficiency than a non-folded optical configuration including refractive lenses but no reflective elements. System efficiency of an optical configuration is important, for example, for applications in Head-Mounted Displays (HMDs). Reduced efficiency can reduce the usability of an AR/VR device and may create discomfort due to higher temperatures as a result of an increased power consumption required by the display to provide a desired image brightness. In some examples, system efficiency is increased using a pancake lens including a beamsplitter that has higher reflectance toward the edges of the beamsplitter than within a central region of the beamsplitter. Lens efficiency may be increased using a polarization-converting beamsplitter lens including a beamsplitter that has higher reflectivity toward the edges of the lens than within a central region of the lens. In some examples, a pancake lens may include a refractive lens and a beamsplitter that may be formed as a reflective coating on a surface of the lens. The reflective coating may have a spatially varying reflectance. In some examples, a pancake lens may include a polarization-converting beamsplitter lens.

In some examples, a reflective polarizer may include a cholesteric liquid crystal, such as a polymer cholesteric liquid crystal. In some examples, a reflective polarizer may include a birefringent multilayer reflective polarizer. In some examples, an apparatus may further include an optical retarder, such as a quarter wave retarder, located between the beamsplitter and the reflective polarizer.

Example reflective polarizers (or other polarizers) may include polarizing films. An example polarizing film may include one or more layers, such as an optical polarizer including a combination of a reflective polarizer and a dichroic polarizer, for example, bonded together.

A beamsplitter may be configured to reflect a first portion of incident light and transmit a second portion of incident light. In some examples, a beamsplitter may include a first region and a second region. In some examples, the second region may generally surround the first region, for example, as a peripheral region but other arrangements are possible. The first region of the beamsplitter may include a coating that is partially transparent and partially reflective, and the second region may be generally reflective. The first and/or second region may include a thin (e.g., about 10-100 nm) coating including a metal such as gold, aluminum or silver. The first and/or second region may include one or more dielectric thin film layers. An example first and/or second region may include one or more layers and include at least one dielectric material, such as silica, aluminum oxide, hafnium oxide, titanium dioxide, magnesium oxide, magnesium fluoride, indium tin oxide, indium gallium zinc oxide, and the like. An example first and/or second region may include a coating including at least one thin metal coating and/or at least one dielectric coating. An example first and/or second region may include at least one of a metal, a dielectric material, or a combination of a metal and a dielectric material (e.g., as a coating including at least one layer). An example second region of the beamsplitter may include a highly reflective coating, such as a metal coating.

In some examples, the first region of an example beamsplitter has a reflectance of about 30% to about 60%, for example, about 50% (or, in other examples, a reflectance of about 45%, about 40%, about 35%, or other suitable reflectance). In some examples, the beamsplitter first region may have a transmission of about 50% (or, in some examples, about 55%, about 60%, about 65%, or other suitable transmission). In some examples, the second region may have a reflectance of about 100%, or, in some examples, about 95%, about 90%, about 85%, about 80%, or other suitable value of reflectance. In some examples, the reflective polarizer may include a cholesteric liquid crystal, such as a polymer cholesteric liquid crystal, such as a cross-linked polymer cholesteric liquid crystal. In some examples, the reflective polarizer may include a birefringent multilayer reflective polarizer combined with a quarter wave retarder placed between the beamsplitter and the reflective polarizer.

In some examples, the first region of the beamsplitter may include a layer that is partially transparent and partially reflective. In some examples, a beamsplitter may include a metal film formed on a substrate, such as a substrate including one or more optical materials. For example, the layer may include a metal layer (e.g., having a thickness between about 5 nm and about 500 nm, such as a thickness between 10 nm and 200 nm), such as a layer including one or more metals such as aluminum, silver, gold, or other metal such as an alloy. The layer may include a multilayer, and may include a corrosion protection layer supported by the exposed surface of the layer (e.g., on a metal layer). In some examples, the layer may include one or more dielectric layers, such as dielectric thin film layers. Dielectric layers may include one or more dielectric layers such as oxide layers (e.g., metal oxide layers or other oxide layers), nitride layers, boride layers, phosphide layers, halide layers (e.g., metal halide layers such as metal fluoride layers), or other suitable layers. Example dielectric layers may include one or more materials such as silica, aluminum oxide, hafnium oxide, titanium dioxide, magnesium oxide, magnesium fluoride, indium tin oxide, indium gallium zinc oxide, and the like. In some examples, the device may include one or more metal layers and/or one or more dielectric layers. A substrate may include glass or an optical polymer.

In some examples, the second region of the beamsplitter may include a highly reflective layer, such as an essentially reflective layer. The second region may include a layer having a reflectance greater than 80%, such as greater than 90%, and in some examples greater than 95%. The layer may include at least one of a metal, a dielectric material, or a combination of a metal and a dielectric material.

The first region may have a circular, square or rectangular shape. A rectangular first region may have a similar aspect ratio to that of the display. The second region may generally surround the first region. If the beamsplitter is formed on a generally circular lens, the outside periphery of the second region may be generally circular. In various examples, a beamsplitter may be formed on a planar, convex, or concave surface, for example, of an optical element such as a lens, polarizer (e.g., reflective or absorption-based polarizer), window, optical retarder, or other optical element. In some examples, a beamsplitter may be formed on the planar or faceted surface of a Fresnel lens.

In some examples, an apparatus includes a display and a beamsplitter lens including a beamsplitter having a reflectance that varies as a function of spatial position; for example, including a first region of relatively high optical transmission and a second region of relatively low optical transmission (e.g., of relatively higher reflectance). In this context, a segmented beamsplitter may have at least two regions having different optical properties, such as regions of different values of reflectance, for example, for one or more visible wavelengths. In some examples, a beamsplitter may have a first region having a first reflectance between 30% and 70%, and a second region having a second reflectance greater than 80%, and in some examples, greater than 90%, such as greater than 95%. In some examples, the first region of the beamsplitter has a reflectance of less than 70% and a second region has a reflectance of greater than 90%. Reflectance may be determined for at least one wavelength of visible light, such as light having a wavelength between 500 nm and 700 nm.

In some examples, a beamsplitter may be formed on an optical substrate such as a lens, and a combination of a lens and a beamsplitter may be termed a beamsplitter lens. A beamsplitter lens may include an optical element having at least one curved surface. A beamsplitter may include a reflective coating formed on or otherwise supported by a planar or a curved surface of an optical element such as a lens.

In some examples, lenses may include a surface such as a concave surface, a convex surface or a planar surface. In some examples, a device may include one or more converging lenses and/or one or more diverging lenses. An optical configuration may include one or more lenses and may be configured to form an image of at least part of the display at an eyebox. A device may be configured so that an eye of a user is located within the eyebox when the device is worn by the user. In some examples, a lens may include a Fresnel lens, for example, having facets formed on an substrate including an optical material. In some examples, an optical configuration may include one or more reflectors, such as mirrors and/or beamsplitters.

In some examples, a component of an optical configuration may include one or more optical materials. For example, an optical material may include glass or an optical plastic. An optical material may be generally transmissive over some or all of the visual spectrum. In some examples, an optical component including a generally transmissive material may have an optical transmissivity of greater than 0.9 for over some all of the visible spectrum.

In some examples, a substrate (e.g., for a beamsplitter), an optical material, and/or a layer (e.g., of an optical component) may include one or more of the following: an oxide (e.g., silica, alumina, titania, other metal oxide such as a transition metal oxide, or other non-metal oxide); a semiconductor (e.g., an intrinsic or doped semiconductor such as silicon (e.g., amorphous or crystalline silicon), carbon, germanium, a pnictide semiconductor, a chalcogenide semiconductor, or the like); a nitride (e.g., silicon nitride, boron nitride, or other nitride including nitride semiconductors); a carbide (e.g., silicon carbide), an oxynitride (e.g., silicon oxynitride); a polymer; a glass (e.g., a silicate glass such as a borosilicate glass, a fluoride glass, or other glass); or other material.

In some examples, an apparatus may include a display (e.g., a display panel) and a folded optic lens optionally having a segmented reflectance such as described herein. Light from the display panel incident on the folded optic lens may be circularly polarized. The display may be an emissive display or may include a backlight. An emissive display may include a light-emitting diode (LED) array, such as an OLED (organic LED) array. In some examples, an LED array may include a microLED array, and the LEDs may have a pitch of approximately or less than 100 microns (e.g., approximately or less than 50 microns, approximately or less than 20 microns, approximately or less than 10 microns, approximately or less than 5 microns, approximately or less than 2 microns, approximately or less than 1 microns, or other pitch value).

In some examples, the display may include a transmissive display (such as a liquid crystal display) and a light source, such as a backlight. In some examples, the display may include a spatial light modulator and a light source. An example spatial light modulator may include a reflective or transmissive switchable liquid crystal array.

In some examples, display light from the display incident on the beamsplitter lens is circularly polarized. The display may include an emissive display (such as a light-emitting diode display) or a light-absorbing panel (such as a liquid crystal panel) in combination with a backlight. An emissive display may include at least one LED array, such as an organic LED (OLED) array. An LED array may include a microLED array. An LED array may include LEDs having a pitch of less than about 100 microns (e.g., about 50 microns, about 20 microns, about 10 microns, about 5 microns, about 2 microns, or about 1 microns, etc.).

In some examples, a display may include a spatial light modulator and a light source (e.g., a backlight). A spatial light modulator may include a reflective or transmissive switchable liquid crystal array. In some examples, the light source (e.g., a backlight) may have and/or allow a spatial variation of illumination intensity over the display. In some examples, the light source may include a scanned source such as a scanned laser. In some examples, the light source may include an arrangement of light emissive elements, such as an array of light emissive elements. An array of light emissive elements may include an array of miniLED and/or microLED emissive elements.

In some examples, a display may include one or more waveguide displays A waveguide display may include a polychromatic display or an arrangement of monochromatic displays. A waveguide display may be configured to project display light from one or more waveguides into an optical configuration configured to form an image of at least part of the display at the eye box.

In some examples, the display brightness may be spatially varied to increase the imaged display brightness uniformity by at least, for example, about 10%, for example, about 20%, for example, about 30%, for example, about 40%, or by some other value. The display illumination variation may be dynamically controlled, for example, by a controller. In some examples, the dynamic illumination variation may be adjusted by a controller receiving eye tracking signals provided by an eye tracking system.

In some examples, the display may have a spatially adjustable brightness (e.g., a spatial variation in illumination intensity). In some examples, the adjustable brightness may be achieved by spatially varying the brightness of an emissive display or of a backlight. The display brightness and/or any spatial variation may be adjustable, for example, by a control circuit. In some examples, the light source may include a scannable light source, such as a laser. In some examples, the light source may include an array of light sources, such as an LED backlight. For example, the array of light sources may include a miniLED or microLED array. The display illumination may be spatially varied to increase the imaged display brightness uniformity by at least about 10% (e.g., about 20%, about 30%, about 40%, or other value). The spatial variation of illumination from the backlight may be dynamically adjusted, and the dynamic adjustment may be controlled by an eye tracking system.

In some examples, a device may include an eye tracker, and the eye tracker may include at least one light source and at least one sensor. An example apparatus may include a light source configured to emit a light beam when the light source is energized. The light source may provide an eye tracker beam, and the apparatus may be configured so that the light beam is reflected from the eye of a user and the reflected light is detected by at least one sensor.

An example apparatus may be configured to include an eye tracker, for example, configured to determine a gaze direction based on sensor data related to at least one reflected light beam. In some examples, the light beam (e.g., an eye tracker beam) may include an optical light beam such as a visible light beam (e.g., a red or other visible color light beam) and/or an IR light beam (e.g., a near-IR beam). The light beam may illuminate the eye. In some examples, the light beam may pass through a beamsplitter (e.g., a partially reflective film) and/or may pass through a reflective polarizer, for example, through an optical film or through an aperture therein. In some examples, a light beam may pass through an aperture in the partially reflective film and/or through the reflective polarizer. The polarization of an eye tracker beam may be configured to be transmitted through the reflective polarizer.

In some examples, an eye tracking beam may pass through the beamsplitter (e.g., through a partially reflective film) with some reduction in intensity. However, an eye tracking function may be based on the sensor data, as the sensor may be responsive to light levels that are significantly less than that emitted by the light source. Additional light sources and/or optical sensors may be arranged behind and/or around the periphery of the pancake lens (e.g., behind and around the beamsplitter such as a partially reflective film) as needed, and one or more light sources and one or more sensors may be used for eye tracking. Alternatively, the beamsplitter may have lower transmission in the visible (e.g., 50% transmission), and higher transmission in the infrared, for example, 60%, 70%, 80%, or 90% or more.

The light source may provide visible and/or infrared (IR) light when energized, for example, as a light beam. The sensor may detect visible and/or IR light. IR light may include near-IR light, and may have a wavelength between 800 and 2500 nm; for example, between 800 nm and 1600 nm. These and any other ranges described herein may be inclusive and/or may have approximate range limits. A light beam may be collimated by one or more optical components, such as a lens and/or aperture, that may be associated with the light source within a unitary housing. In some examples, a light beam may diverge by a divergence angle that may be between less than 1 degrees (e.g., for a well collimated beam) and approximately 30 degrees.

The light source and/or sensor may emit or detect selected wavelength bands (e.g., matched wavelength bands) such as near-IR or visible light. Example wavelength bands include bands having a wavelength centered at approximately 850 nm, approximately 940 nm, or approximately 1550 nm. In representative examples, the bandwidth may be approximately 50 nm, 100 nm, 150 nm, or 200 nm. Optical filters (such as filters showing selective optical transmission bands in the visible or near-IR wavelengths) may be used to select (e.g., selectively transmit) predetermined wavelength bands such as those discussed above for a light beam transmission and/or for light detection.

In some examples, an eye tracker may include one or more light sources. An example light source may include a laser diode, such as a vertical cavity surface emitting laser (VCSEL). A light source (e.g., a laser such as a VCSEL) may be configured to generate a circularly polarized light beam. A laser may include or be associated with one or more optical elements that may be configured to shape the light beam. An optical element may include a lens, an optical vortex, a diffractive element, a refractive element, or other optical element. In some examples, a light source and/or one or more optical elements may include one or more of grayscale processing, a meta-lens etching, or phase element configured to generate a polarized light beam, such as a linearly or circularly polarized light beam.

In some examples, the light source may include a laser such as a semiconductor laser, such as a VCSEL. An example light source, such as a VCSEL, may be configured to emit a polarized light beam, such as a circularly polarized, elliptically polarized, or linearly polarized light beam.

In some examples, an apparatus may include one or more light sources and/or one or more sensors. Light sources are discussed further below. In some examples, a sensor may include an image sensor and may include, for example, a sensor array. The sensor may receive light using one or more optical components such as a lens, and the sensor and the one or more optical components may be configured as an imaging system.

In some examples, an apparatus may include one or more of the following: a complementary metal-oxide-semiconductor (CMOS) sensor, charge coupled device (CCD) sensor, photodiode, angular sensor, position sensor (e.g., a differential position sensor), interferometry sensor, time-of-flight (ToF) sensor, and/or an optical coherence tomography (OCT) sensor. In some examples, a sensor may be or include an image sensor. An apparatus may include one or more of a particular sensor type and/or may include different sensor types.

In some examples, a sensor may be associated with a light source, for example, within a module, or may be located proximate the light source or elsewhere. For example, a sensor may be adjacent or proximate the light source, or otherwise supported by or mechanically associated with the light source. In some examples, at least one sensor and at least one light source may be enclosed by the same housing. The sensor may be supported by the light source, or vice versa. The sensor and light source may be combined into a unitary device. In some examples, the sensor and light source may be combined in a self-mixing interferometer (SMI). An example SMI may include a light source such as a laser (e.g., a laser diode) and a sensor, such as a combination of a laser and a sensor.

In some examples, the sensor may a component of a one or two-dimensional scanning system. In some examples, the sensor in combination with the pancake lens may be configured to detect light that is emitted by the light source and/or not emitted by the display panel.

The location of user attention within an image may be determined, for example, using an eye tracker. For example, an eye tracker may determine gaze direction. A displayed image may include a first portion to which user attention is directed and a second portion outside of the user's attention. In some examples, a display parameter such as an image contrast or an image resolution may be higher within the first portion than for the second portion. In some examples, the foveal vision of the user may be located within the first portion of the image. In some examples, the second portion may be located within the peripheral vision of the user. In some examples, the first portion of the image may include a graphic element. In some examples, the first portion of the image may include an augmented reality image element within an image of the physical environment. The image may be modified based on the attention paid to the first portion of the image. In some examples, the attention paid to the first portion of the image may be used to select from a menu, enter data, or to otherwise provide a control signal to a computer system.

In some example, a device may include one or more actuators. Example actuators may include a piezoelectric actuator, which may include a piezoelectric material such as a crystal or ceramic material. Example actuators may include an actuator material such as one or more of the following: lead magnesium niobium oxide, lead zinc niobium oxide, lead scandium tantalum oxide, lead lanthanum zirconium titanium oxide, barium titanium zirconium oxide, barium titanium tin oxide, lead magnesium titanium oxide, lead scandium niobium oxide, lead indium niobium oxide, lead indium tantalum oxide, lead iron niobium oxide, lead iron tantalum oxide, lead zinc tantalum oxide, lead iron tungsten oxide, barium strontium titanium oxide, barium zirconium oxide, bismuth magnesium niobium oxide, bismuth magnesium tantalum oxide, bismuth zinc niobium oxide, bismuth zinc tantalum oxide, lead ytterbium niobium oxide, lead ytterbium tantalum oxide, strontium titanium oxide, bismuth titanium oxide, calcium titanium oxide, lead magnesium niobium titanium oxide, lead magnesium niobium titanium zirconium oxide, lead zinc niobium titanium oxide, lead zinc niobium titanium zirconium oxide as well as any of the previous mixed with any of the previous and/or traditional ferroelectrics including lead titanium oxide, lead zirconium titanium oxide, barium titanium oxide, bismuth iron oxide, sodium bismuth titanium oxide, lithium tantalum oxide, sodium potassium niobium oxide, and lithium niobium oxide. Also lead titanate, lead zirconate, lead zirconate titanate, lead magnesium niobate, lead magnesium niobate-lead titanate, lead zinc niobate, lead zinc niobate-lead titanate, lead magnesium tantalate, lead indium niobate, lead indium tantalate, barium titanate, lithium niobate, potassium niobate, sodium potassium niobate, bismuth sodium titanate, or bismuth ferrite. One or more of the above-listed example actuator materials may also be used as an optical material, a layer (e.g., of an optical component) or a substrate material (e.g., as a substrate for a beamsplitter). In some examples, an actuator may be configured to adjust the position and/or conformation of an optical element, such as a lens.

In some examples, a method for providing a uniform image brightness from a display (e.g., including a display panel) using a folded optical configuration may include spatially adjusting the spatial profile of the illumination brightness of a light source (e.g., a backlight) and/or an emissive display. Display brightness may be adjusted as a function of one or more display parameters, such as spatial position on the display (e.g., spatial variations in image brightness), power consumption, aging effects, eye response functions, and/or other parameter(s).

Example methods include computer-implemented methods for operating an apparatus, such as an apparatus as described herein. The steps of an example method may be performed by any suitable computer-executable code and/or computing system, including an apparatus such as an augmented reality and/or virtual reality system. In some examples, one or more of the steps of an example method may represent an algorithm whose structure includes and/or may be represented by multiple sub-steps. In some examples, a method for providing a uniform image brightness from a display using a folded optic configuration may include using a display panel that is configured to allow a spatial variation of the display brightness.

In some examples, an apparatus, such as a device or system, may include at least one physical processor and physical memory including computer-executable instructions that, when executed by the physical processor, cause the physical processor to generate an image on the display. The image may include a virtual reality image element and/or an augmented reality image element. The apparatus may include an optical configuration such as described herein.

In some examples, a non-transitory computer-readable medium may include one or more computer-executable instructions that, when executed by at least one processor of an apparatus (e.g., a head mounted device), cause the apparatus to provide an augmented reality image or a virtual reality image to the user (e.g., the wearer of the head mounted device). The apparatus may include an optical configuration such as described herein.

An example device may include a beamsplitter and a reflective polarizer. The beamsplitter may regions of different reflectance, for example, a first region that transmits at least 20% of incident light and a second region that transmits less than 10% of incident light and may be generally reflective. For example, the first region of a beamsplitter may include a central portion of the beamsplitter (e.g., located in a portion proximate the optic axis of the lens), and the second region may include a peripheral region of the beamsplitter, for example, an edge portion. In some examples, the beamsplitter may include a plurality of regions. In some examples, the reflectance of each beamsplitter region may generally increase along a direction away from the center of the beamsplitter (e.g., along a direction away from an optic axis of a beamsplitter lens). An example reflective polarizer may be configured to reflect one polarization of light and transmits another polarization of light. For example, an example reflective polarizer may reflect one handedness of circularly polarized light and may transmit the other handedness of circularly polarized light. An example reflective polarizer may reflect on linear polarization direction and transmit an orthogonal linear polarization direction. An example device may include a display, and the display may be configured to emit polarized light. In some examples, an apparatus may be an augmented reality and/or virtual reality (AR/VR) headset.

EXAMPLE EMBODIMENTS

Example 1. An example apparatus may include a display, a beamsplitter including a first region and a second region and a reflective polarizer, where the first region of the beamsplitter has a first reflectance, the second region of the beamsplitter has a second reflectance, the second reflectance is at least 20% greater than the first reflectance for at least one wavelength of visible light, and the apparatus is configured so that a light ray emitted by the display is transmitted through the first region of the beamsplitter, reflects from the reflective polarizer, reflects from the second region of the beamsplitter, and is transmitted through the reflective polarizer.

Example 2. The apparatus of example 1, where the second reflectance is at least 30% greater than the first reflectance.

Example 3. The apparatus of any of examples 1 and 2, where the first reflectance is between 30% and 70%, and the second reflectance is greater than 80%.

Example 4. The apparatus of any of examples 1-3, where the first reflectance is between 40% and 60%.

Example 5. The apparatus of any of examples 1-4, where the second reflectance is greater than 90%.

Example 6. The apparatus of any of examples 1-5, where the apparatus is configured so that the light ray emitted from the display has a circular polarization.

Example 7. The apparatus of any of examples 1-6, further including an optical retarder located between the beamsplitter and the reflective polarizer.

Example 8. The apparatus of example 7, where the apparatus is configured so that the light ray has a first transmission through the optical retarder after passing through the first region of the beamsplitter, and the light ray has a first linear polarization after the first transmission through the optical retarder.

Example 9. The apparatus of any of examples 7 or 8, where the apparatus is further configured so that the light ray is transmitted through the optical retarder a second time after reflection from the second region of the beamsplitter.

Example 10. The apparatus of any of examples 1-9, where the display is a liquid crystal display.

Example 11. The apparatus of any of examples 1-10, where the apparatus is a head-mounted device.

Example 12. The apparatus of any of examples 1-11, where the apparatus is an augmented reality device or a virtual reality device.

Example 13. The apparatus of any of examples 1-12, where the beamsplitter includes a layer formed on an optical element, and the optical element includes a lens.

Example 14. The apparatus of example 13, where the layer has a first thickness in the first region, the layer has a second thickness in the second region, and the second thickness is greater than the first thickness.

Example 15. The apparatus of any of examples 1-14, where the first region of the beamsplitter is partially reflective and partially transmissive, and the second region of the beamsplitter is essentially reflective.

Example 16. The apparatus of any of examples 1-15, where the first region includes a partially transmissive optical film, and the second region includes a reflective metal film.

Example 17. An example method may include emitting light from a display, transmitting the light through a first region of a beamsplitter, reflecting the light from a reflective polarizer, and directing the light from a second region of the beamsplitter through the reflective polarizer and towards an eye of a user, where the first region of the beamsplitter has a first reflectance for the light of greater than 90%, and the second region of the beamsplitter has a second reflectance for the light of less than 70%.

Example 18. The method of example 17, where the method is performed by a head mounted device, and the method further includes displaying an augmented reality image or a virtual reality image to the user using the light.

Example 19. The method of any of examples 17 and 18, where the light passes through an optical retarder before passing through the reflective polarizer.

Example 20. A method may include emitting light having a first circular polarization from a display, transmitting the light through a first region of a beamsplitter, reflecting the light from a reflective polarizer, and reflecting the light from a second region of the beamsplitter through the reflective polarizer and towards an eye of a user, where the light has a second circular polarization when the light is transmitted through the reflective polarizer, the first region of the beamsplitter has a first reflectance, the second region of the beamsplitter has a second reflectance, and the second reflectance is greater than the first reflectance.

As detailed above, embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. In some examples, there may be additional acoustic transducers 1520 located on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a BLUETOOTH connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below left and right display devices (1515(A) and 1515(B) respectively), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, for example, the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 1500 and/or virtual-reality system 1600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 1500 and/or virtual-reality system 1600 may include microLED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

FIG. 17 is an illustration of an exemplary system 1700 that incorporates an eye-tracking subsystem capable of tracking a user's eye(s). As depicted in FIG. 17, system 1700 may include a light source 1702, an optical subsystem 1704, an eye-tracking subsystem 1706, and/or a control subsystem 1708. In some examples, light source 1702 may generate light for an image (e.g., to be presented to an eye 1701 of the viewer). Light source 1702 may represent any of a variety of suitable devices. For example, light source 1702 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1704 may receive the light generated by light source 1702 and generate, based on the received light, converging light 1720 that includes the image. In some examples, optical subsystem 1704 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1720. Further, various mechanical couplings may serve to maintain the relative spacing and/or the orientation of the optical components in any suitable combination.

In one embodiment, eye-tracking subsystem 1706 may generate tracking information indicating a gaze angle of an eye 1701 of the viewer. In this embodiment, control subsystem 1708 may control aspects of optical subsystem 1704 (e.g., the angle of incidence of converging light 1720) based at least in part on this tracking information. Additionally, in some examples, control subsystem 1708 may store and utilize historical tracking information (e.g., a history of the tracking information over a given duration, such as the previous second or fraction thereof) to anticipate the gaze angle of eye 1701 (e.g., an angle between the visual axis and the anatomical axis of eye 1701). In some embodiments, eye-tracking subsystem 1706 may detect radiation emanating from some portion of eye 1701 (e.g., the cornea, the iris, the pupil, or the like) to determine the current gaze angle of eye 1701. In other examples, eye-tracking subsystem 1706 may employ a wavefront sensor to track the current location of the pupil.

Any number of techniques can be used to track eye 1701. Some techniques may involve illuminating eye 1701 with infrared light and measuring reflections with at least one optical sensor that is tuned to be sensitive to the infrared light. Information about how the infrared light is reflected from eye 1701 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1706 may be digitized (i.e., converted to an electronic signal). Further, the sensor may transmit a digital representation of this electronic signal to one or more processors (e.g., processors associated with an apparatus including eye-tracking subsystem 1706). Eye-tracking subsystem 1706 may include any of a variety of sensors in a variety of different configurations. For example, eye-tracking subsystem 1706 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1706 to track the movement of eye 1701. In another example, these processors may track the movements of eye 1701 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1706 may be programmed to use an output of the sensor(s) to track movement of eye 1701. In some embodiments, eye-tracking subsystem 1706 may analyze the digital representation generated by the sensors to extract eye rotation information from changes in reflections. In one embodiment, eye-tracking subsystem 1706 may use corneal reflections or glints (also known as Purkinje images) and/or the center of the eye's pupil 1722 as features to track over time.

In some embodiments, eye-tracking subsystem 1706 may use the center of the eye's pupil 1722 and infrared or near-infrared, non-collimated light to create corneal reflections. In these embodiments, eye-tracking subsystem 1706 may use the vector between the center of the eye's pupil 1722 and the corneal reflections to compute the gaze direction of eye 1701. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1706 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1701 may act as a retroreflector as the light reflects off the retina, thereby creating a bright pupil effect similar to a red-eye effect in photography. If the illumination source is offset from the optical path, then the eye's pupil 1722 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1708 may control light source 1702 and/or optical subsystem 1704 to reduce optical aberrations (e.g., chromatic aberrations and/or monochromatic aberrations) of the image that may be caused by or influenced by eye 1701. In some examples, as mentioned above, control subsystem 1708 may use the tracking information from eye-tracking subsystem 1706 to perform such control. For example, in controlling light source 1702, control subsystem 1708 may alter the light generated by light source 1702 (e.g., by way of image rendering) to modify (e.g., pre-distort) the image so that the aberration of the image caused by eye 1701 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 18A:
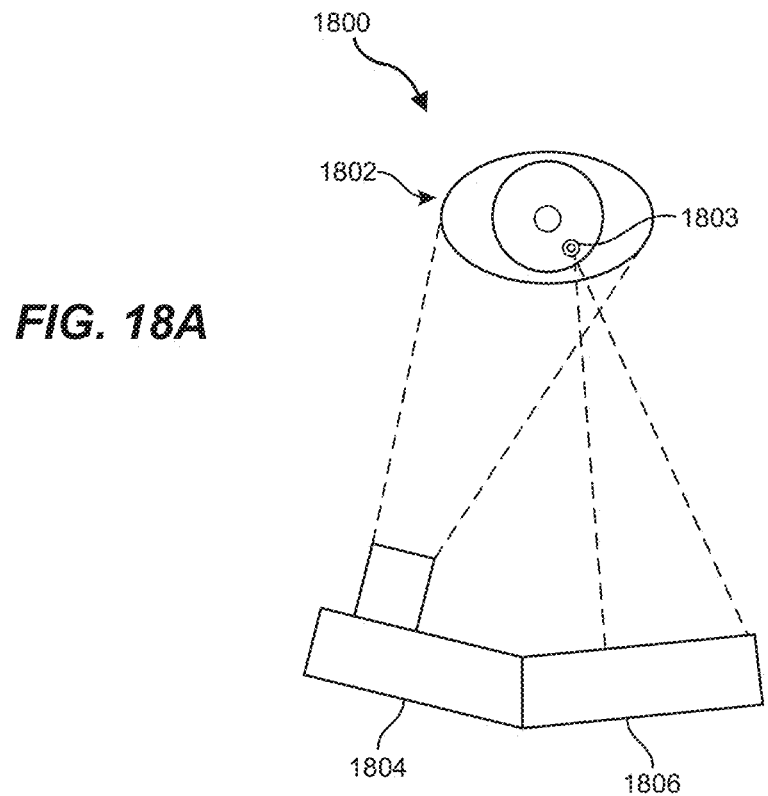
FIGS. 18A and 18B are a more detailed illustration of various aspects of the eye-tracking subsystem illustrated in FIG. 17.
Figure 18B:
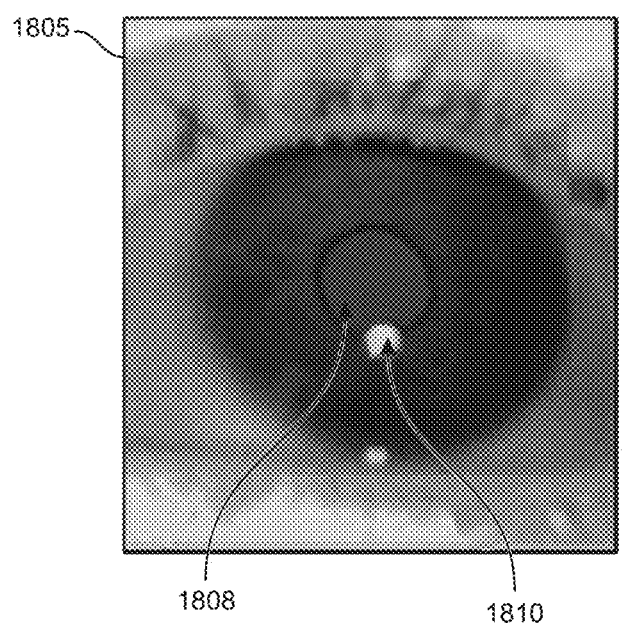

FIG. 18A is a more detailed illustration of various aspects of the eye-tracking subsystem illustrated in FIG. 17. As shown in this figure, an eye-tracking subsystem 1800 may include at least one source 1804 and at least one sensor 1806. Source 1804 may represent any type of device or form of element capable of emitting radiation. In some examples, source 1804 may generate visible, infrared, and/or near-infrared radiation. In some examples, source 1804 may radiate non-collimated infrared and/or near-infrared portions of the electromagnetic spectrum towards an eye 1802 of a user. Source 1804 may utilize a variety of sampling rates and speeds. For example, the disclosed systems may use sources with higher sampling rates in order to capture fixational eye movements of a user's eye 1802 and/or to correctly measure saccade dynamics of the user's eye 1802. As noted above, any type or form of eye-tracking technique may be used to track the user's eye 1802, including optical-based eye-tracking techniques, ultrasound-based eye-tracking techniques, etc.

Sensor 1806 generally represents any type or form of element capable of detecting radiation, such as radiation reflected off the user's eye 1802. Examples of sensor 1806 include, without limitation, a charge coupled device (CCD), a photodiode array, a complementary metal-oxide-semiconductor (CMOS) based sensor device, and/or the like. In one example, sensor 1806 may represent a sensor having predetermined parameters, including, but not limited to, a dynamic resolution range, linearity, and/or other characteristic selected and/or designed specifically for eye tracking.

As detailed above, eye-tracking subsystem 1800 may generate one or more glints. As detailed above, a glint 1803 may represent reflections of radiation (e.g., infrared radiation from an infrared source, such as source 1804) from the structure of the user's eye. In various embodiments, glint 1803 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 18B shows an example image 1805 captured by an eye-tracking subsystem, such as eye-tracking subsystem 1800. In this example, image 1805 may include both the user's pupil 1808 and a glint 1810 near the same. In some examples, pupil 1808 and/or glint 1810 may be identified using an artificial-intelligence-based algorithm, such as a computer-vision-based algorithm. In one embodiment, image 1805 may represent a single frame in a series of frames that may be analyzed continuously in order to track the eye 1802 of the user. Further, pupil 1808 and/or glint 1810 may be tracked over a period of time to determine a user's gaze.

In one example, eye-tracking subsystem 1800 may be configured to identify and measure the inter-pupillary distance (IPD) of a user. In some embodiments, eye-tracking subsystem 1800 may measure and/or calculate the IPD of the user while the user is wearing the artificial reality system. In these embodiments, eye-tracking subsystem 1800 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes may be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1700 and/or eye-tracking subsystem 1800 may be incorporated into augmented-reality system 1500 in FIG. 15 and/or virtual-reality system 1600 in FIG. 16 to enable these systems to perform various eye-tracking tasks (including one or more of the eye-tracking operations described herein).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (e.g., eye-tracking sensor data), transform the data (e.g., into one or more of gaze direction, object viewed, or other vision parameter), output a result of the transformation to perform a function (e.g., modify an augmented reality environment, modify a real environment, modify an operational parameter of a real or virtual device, provide a control signal to an apparatus such as an electronic device, vehicle, or other apparatus), use the result of the transformation to perform a function, and store the result of the transformation to perform a function (e.g., in a memory device). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein may be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising:
a display;
a beamsplitter comprising a first region and a second region; and
a reflective polarizer;
wherein:
the first region of the beamsplitter has a first reflectance;
the second region of the beamsplitter has a second reflectance;
the second reflectance is at least 20% greater than the first reflectance for at least one wavelength of visible light; and
the apparatus is configured so that a light ray emitted by the display is transmitted through the first region of the beamsplitter, reflects from the reflective polarizer, reflects from the second region of the beamsplitter, and is transmitted through the reflective polarizer.

2. The apparatus of claim 1, wherein the second reflectance is at least 30% greater than the first reflectance.

3. The apparatus of claim 1, wherein:
the first reflectance is between 30% and 70%; and
the second reflectance is greater than 80%.

4. The apparatus of claim 3, wherein the first reflectance is between 40% and 60%.

5. The apparatus of claim 3, wherein the second reflectance is greater than 90%.

6. The apparatus of claim 1, wherein the apparatus is configured so that the light ray emitted from the display has a circular polarization.

7. The apparatus of claim 1, further comprising an optical retarder located between the beamsplitter and the reflective polarizer.

8. The apparatus of claim 7, wherein the apparatus is configured so that:
the light ray has a first transmission through the optical retarder after passing through the first region of the beamsplitter; and
the light ray has a first linear polarization after the first transmission through the optical retarder.

9. The apparatus of claim 8, wherein the apparatus is further configured so that the light ray is transmitted through the optical retarder a second time after reflection from the second region of the beamsplitter.

10. The apparatus of claim 1, wherein the display is a liquid crystal display.

11. The apparatus of claim 1, wherein the apparatus is a head-mounted device.

12. The apparatus of claim 1, wherein the apparatus is an augmented reality device or a virtual reality device.

13. The apparatus of claim 1, wherein:
the beamsplitter includes a layer formed on an optical element; and
the optical element includes a lens.

14. The apparatus of claim 13, wherein:
the layer has a first thickness in the first region;
the layer has a second thickness in the second region; and
the second thickness is greater than the first thickness.

15. The apparatus of claim 1, wherein:
the first region of the beamsplitter is partially reflective and partially transmissive; and
the second region of the beamsplitter is essentially reflective.

16. The apparatus of claim 1, wherein:
the first region comprises a partially transmissive optical film; and
the second region comprises a reflective metal film.

17. A method, comprising:
emitting light from a display;
transmitting the light through a first region of a beamsplitter;
reflecting the light from a reflective polarizer; and
directing the light from a second region of the beamsplitter through the reflective polarizer and towards an eye of a user, wherein:
the first region of the beamsplitter has a first reflectance for the light of greater than 90%; and
the second region of the beamsplitter has a second reflectance for the light of less than 70%.

18. The method of claim 17, wherein:
the method is performed by a head mounted device; and
the method further includes displaying an augmented reality image or a virtual reality image to the user using the light.

19. The method of claim 17, wherein the light passes through an optical retarder before passing through the reflective polarizer.

20. A method, comprising:
emitting light having a first circular polarization from a display;
transmitting the light through a first region of a beamsplitter;
reflecting the light from a reflective polarizer; and
reflecting the light from a second region of the beamsplitter through the reflective polarizer and towards an eye of a user, wherein
the light has a second circular polarization when the light is transmitted through the reflective polarizer;
the first region of the beamsplitter has a first reflectance;
the second region of the beamsplitter has a second reflectance; and
the second reflectance is greater than the first reflectance.

* * * * *